United States Patent
Wakasa et al.

(10) Patent No.: US 10,544,777 B2
(45) Date of Patent: Jan. 28, 2020

(54) METHOD AND DEVICE FOR CONTROLLING FLOATING BODY WIND TURBINE POWER GENERATING APPARATUS, AND FLOATING BODY WIND TURBINE POWER GENERATING APPARATUS

(71) Applicant: MHI VESTAS OFFSHORE WIND A/S, Aarhus N (DK)

(72) Inventors: Tsuyoshi Wakasa, Tokyo (JP); Satoshi Iwasaki, Tokyo (JP); Yukio Yamashita, Tokyo (JP); Yoshiyuki Hayashi, Tokyo (JP)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 41 days.

(21) Appl. No.: 16/008,081

(22) Filed: Jun. 14, 2018

(65) Prior Publication Data
US 2018/0291875 A1    Oct. 11, 2018

Related U.S. Application Data

(62) Division of application No. 14/655,335, filed as application No. PCT/JP2012/083832 on Dec. 27, 2012, now Pat. No. 10,024,303.

(51) Int. Cl.
   *F03D 7/02* (2006.01)
   *F03D 7/04* (2006.01)
   *B63B 35/44* (2006.01)

(52) U.S. Cl.
   CPC .......... *F03D 7/0252* (2013.01); *F03D 7/026* (2013.01); *F03D 7/0224* (2013.01);
   (Continued)

(58) Field of Classification Search
   None
   See application file for complete search history.

(56) References Cited

U.S. PATENT DOCUMENTS

| 8,022,566 B2 | 9/2011 | Loh et al. |
| 8,053,916 B2 | 11/2011 | Edwards et al. |

(Continued)

FOREIGN PATENT DOCUMENTS

| EP | 2489872 A1 | 8/2012 |
| JP | 2009-513881 A | 4/2009 |

(Continued)

OTHER PUBLICATIONS

International Search Report and Written Opinion dated Apr. 9, 2013, corresponding to International application No. PCT/JP2012/083832. 8pp.

(Continued)

*Primary Examiner* — Woody A Lee, Jr.
*Assistant Examiner* — Sabbir Hasan
(74) *Attorney, Agent, or Firm* — Kanesaka, Berner & Partners

(57) ABSTRACT

A method of controlling a floating-body wind turbine power generating apparatus including a wind turbine generator disposed on a floating body includes a pitch-angle increasing step of increasing a pitch angle of a blade of the wind turbine generator when the wind turbine generator is stopped, so that an aerodynamic braking force is applied to a rotor of the wind turbine generator. In the pitch-angle increasing step, a first change rate of the pitch angle of the blade in a first period during which the wind turbine generator is in an inclining motion toward an upwind side from a vertical direction due to sway of the floating body, is smaller than a second change rate of the pitch angle of the blade in a second period during which the wind turbine generator is in an (Continued)

inclining motion toward a downwind side from the vertical direction due to the sway of the floating body.

7 Claims, 14 Drawing Sheets

(52) U.S. Cl.
CPC .............. *F03D 7/0244* (2013.01); *F03D 7/04* (2013.01); *B63B 2035/446* (2013.01); *F05B 2240/93* (2013.01); *F05B 2260/901* (2013.01); *F05B 2270/309* (2013.01); *Y02E 10/721* (2013.01); *Y02E 10/723* (2013.01)

(56) References Cited

U.S. PATENT DOCUMENTS

| | | |
|---|---|---|
| 8,215,896 B2 | 7/2012 | Kooijman et al. |
| 8,240,990 B2 | 8/2012 | Kammer et al. |
| 2007/0212209 A1 | 9/2007 | Borgen |
| 2008/0260514 A1 | 10/2008 | Nielsen et al. |
| 2010/0003134 A1 | 1/2010 | Edwards et al. |
| 2011/0140420 A1 | 6/2011 | Loh et al. |

FOREIGN PATENT DOCUMENTS

| | | |
|---|---|---|
| JP | 2009-523208 A | 6/2009 |
| JP | 2011-256758 A | 12/2011 |
| WO | 2010/084131 A2 | 7/2010 |

OTHER PUBLICATIONS

E.Bossanyi, B.Savini, M.Iribas, M.Hau, B.Fischer, D.Schlipf, T.van Engelen, M.Rossetti and C.E.Carcangiu "Advanced controller research for multi-MW wind turbines in the UPWIND project", Wind Energ.2012;15:119-145. 27pp.

International Preliminary Report on Patentability dated Jul. 9, 2015, corresponding to International patent application No. PCT/JP2012/083832. 11pp.

Extended European Search Report dated Oct. 9, 2015, corresponding to European Patent Application No. 12891221.9. 6pp.

Decision to Grant in JP Application No. 2014-553957, dated May 6, 2016. 6pp.

Decision to Grant in KR Application No. 10-2015-7014877, dated Jun. 15, 2016. 3pp.

Decision to grant a European patent in EP Application No. 12891221.9, dated Sep. 29, 2016. 2pp.

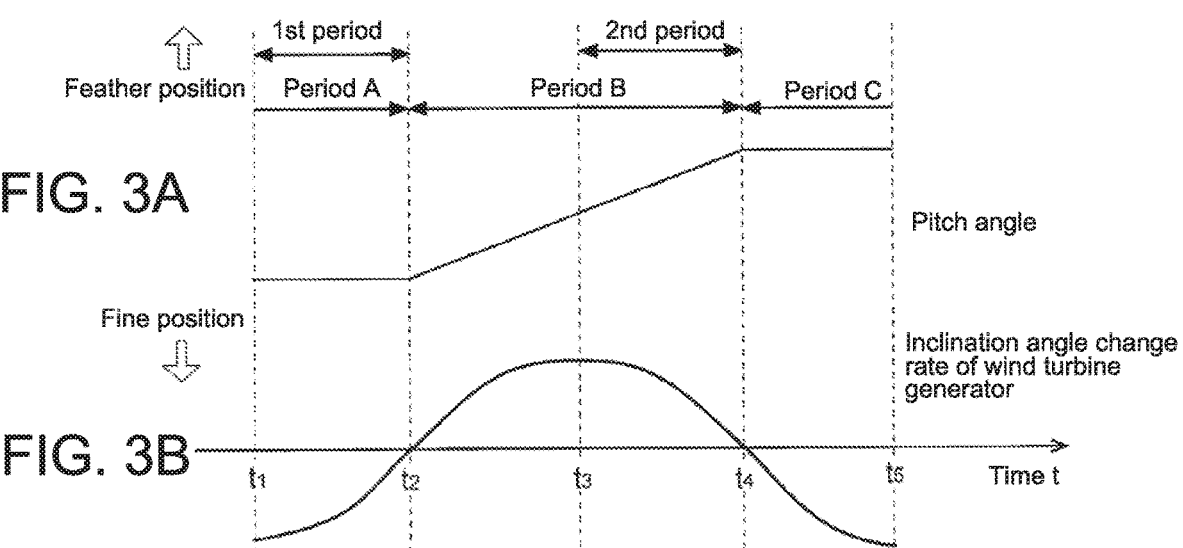
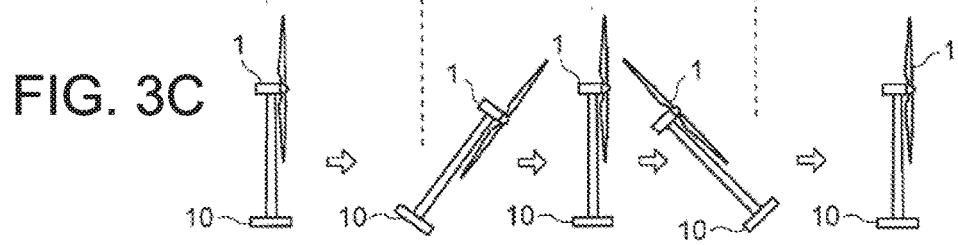

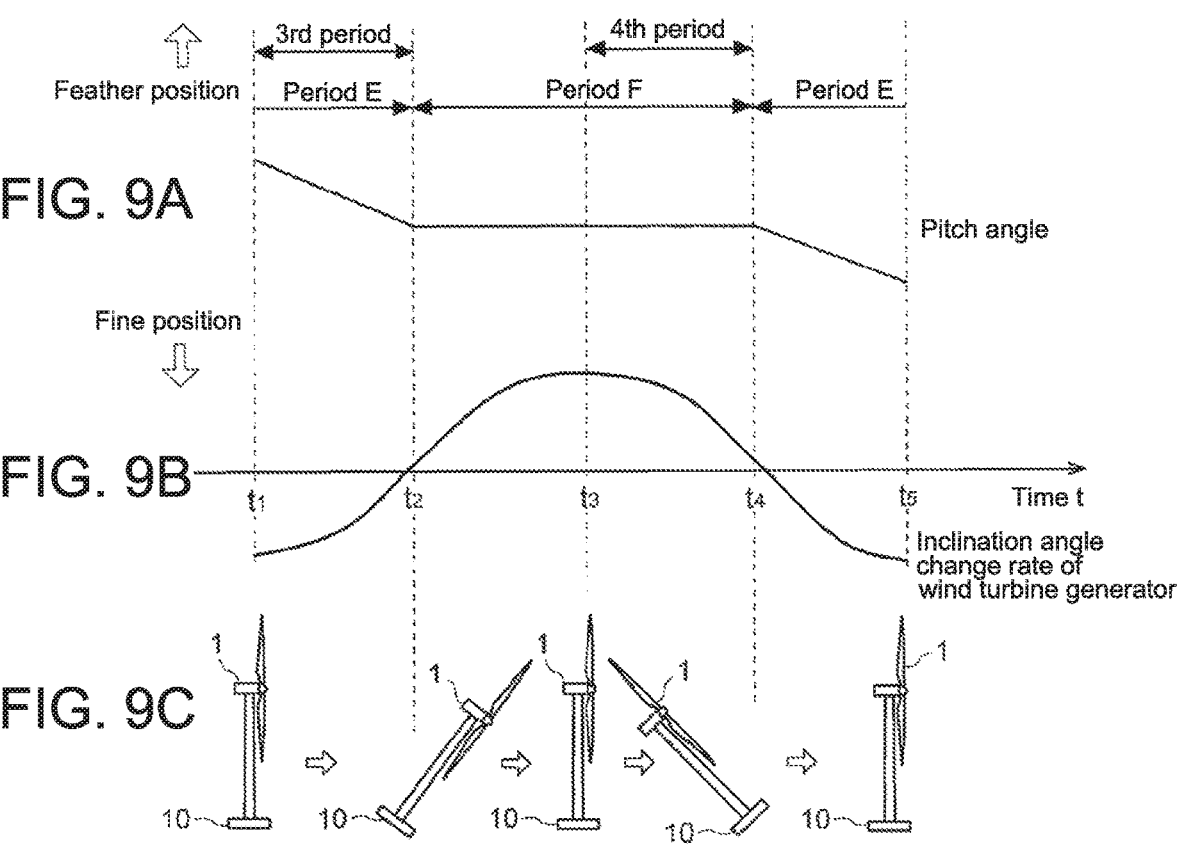

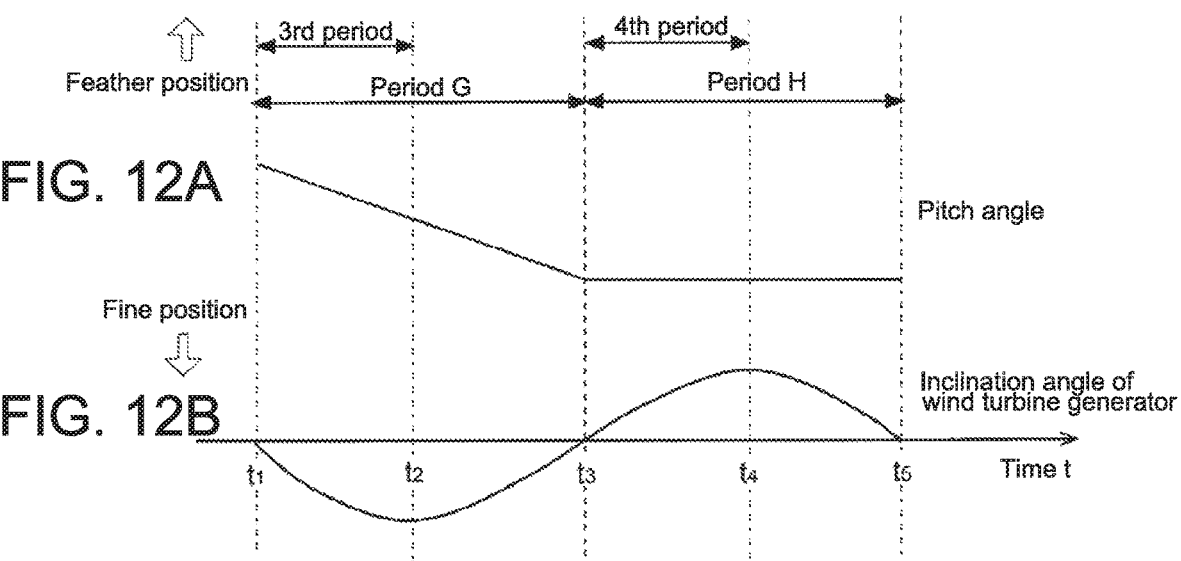
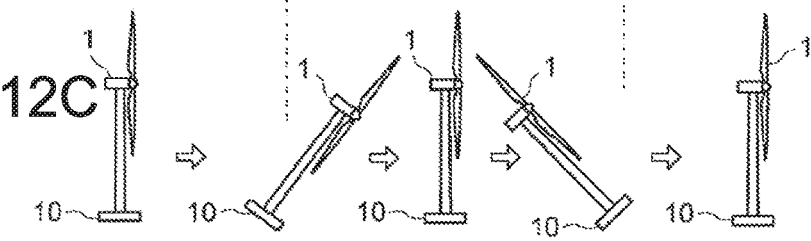

METHOD AND DEVICE FOR CONTROLLING FLOATING BODY WIND TURBINE POWER GENERATING APPARATUS, AND FLOATING BODY WIND TURBINE POWER GENERATING APPARATUS

RELATED APPLICATIONS

The present application is a division of U.S. patent application Ser. No. 14/655,335 filed on Jun. 25, 2015, which is a National Phase of International Application Number PCT/JP2012/083832 filed Dec. 27, 2012. The contents of all of the above-listed prior applications are incorporated by reference herein in their entireties.

TECHNICAL FIELD

The present disclosure relates to a method and device for controlling a floating-body wind turbine power generating apparatus including a wind turbine generator disposed on a floating body, and a floating-body wind turbine power generating apparatus.

BACKGROUND

Wind turbine power generating apparatuses have become increasingly popular in recent years in view of preservation of the global environment. In a typical wind turbine power generating apparatus, pitch angles of blades are variable, and a pitch control is performed in accordance with the operation state of the wind turbine power generating apparatus.

For instance, although not related to a floating-body wind turbine power generating apparatus, Patent Documents 1 to 3 disclose a pitch-control method whereby a load applied to a wind turbine power generating apparatus is reduced. Further, Non-patent Document 1 discloses a method of controlling the pitch of each blade individually so as to reduce an ultimate load of a wind turbine power generating apparatus upon occurrence of gust or shutdown of the system (p. 126-127).

CITATION LIST

Patent Literature

Patent Document 1: U.S. Pat. No. 8,215,896
Patent Document 2: U.S. Pat. No. 8,240,990
Patent Document 3: Japanese Unexamined Patent Application (PCT Translation) Publication No. 2009-523208

Non-Patent Literature

Non-patent Document 1: E. Bossanyi, B. Savini, M. Iribas, M. Hau, B. Fischer, D. Schlipf, T. van Engelen, M. Rossetti and C. E. Carcangiu "Advanced controller reserch for multi-MW wind turbines in the UPWIND project", Wind Energ. 2012; 15:119-145

SUMMARY

Technical Problem

Meanwhile, in a floating-body wind turbine power generating apparatus, there is a close mutual relationship between sway of a floating body and an aerodynamic load of a thrust component (a thrust force) received by a rotor.

That is, a thrust force received by the rotor from wind is affected by sway of a floating body, because a wind turbine generator (rotor) moves back and forth due to the sway of the floating body. For instance, while the floating-body wind turbine power generating apparatus inclines toward the upwind side due to sway of the floating body, a relative wind velocity with respect to the rotor is a sum of an actual wind velocity and a moving velocity of the wind turbine generator (rotor) moving toward the upwind side, so the thrust force received by the rotor from wind is relatively large. On the other hand, while the wind turbine power generating apparatus inclines toward the downwind side due to sway of the floating body, a relative wind velocity with respect to the rotor is a remainder of an actual wind velocity subtracted by a moving velocity of the wind turbine generator (rotor) toward the downwind side, so the thrust force received by the rotor from wind is relatively small.

Conversely, it is clear that the thrust force received by the rotor from wind affects the sway of the floating body, because the swaying mechanism of the floating body can be basically described by a motion equation based on a restoring force due to inertia of the floating-body wind turbine power generating apparatus and buoyance acting on the floating body, and an aerodynamic thrust force acting on the rotor. Thus, when a thrust force received by the rotor from wind is varied by the pitch control, the change also affects the sway of the floating body. For instance, if an aerodynamic braking force is applied to the rotor by the pitch control while the wind turbine power generating apparatus inclines toward the upwind side, the aerodynamic thrust force received by the rotor rapidly decreases, which thereby promotes inclination of the wind turbine power generating apparatus toward the upwind side. On the other hand, if an aerodynamic load of a torque component received by the rotor is to be increased by the pitch control while the wind turbine power generating apparatus inclines toward the downwind side, the aerodynamic thrust force received by the rotor also increases, which also promotes inclination of the wind turbine.

In this regard, while Patent Documents 1 to 3 and Non-patent. Document 1 disclose methods of reducing a thrust force by the pitch control to prevent an excessive load from being applied to a wind turbine power generating apparatus, such methods are applied to onshore wind turbine power generating apparatuses and bottom-mounted offshore wind turbine power generating apparatuses. Thus, the above methods do not disclose suitable pitch control taking account of the relationship between sway of a floating body and an aerodynamic thrust force received by a rotor.

An object of at least one embodiment of the present invention is to provide a method and device for controlling a wind turbine power generating apparatus capable of performing pitch control taking account of a relationship between sway of a floating body and an aerodynamic thrust force received by a rotor when a wind turbine generator is stopped or started, and a floating-body wind turbine power generating apparatus.

Solution to Problem

A method of controlling a floating-body wind turbine power generating apparatus according to at least one embodiment of the present invention is for a floating-body wind turbine power generating apparatus including a wind turbine generator disposed on a floating body. The method includes a pitch-angle increasing step of increasing a pitch angle of a blade of the wind turbine generator when the wind turbine generator is stopped, so that an aerodynamic braking force is applied to a rotor of the wind turbine generator. In the pitch-angle increasing step, a first change rate of the pitch angle of the blade in a first period during which the wind turbine generator is in an inclining motion toward an upwind side from a vertical direction due to sway of the floating body, is smaller than a second change rate of the pitch angle of the blade in a second period during which the wind turbine generator is in an inclining motion toward a downwind side from the vertical direction due to the sway of the floating body.

When the wind turbine generator is stopped, in the first period, during which the wind turbine generator is in an inclining motion toward the upwind side from the vertical direction, the thrust force received by the rotor from wind is a factor that reduces the acceleration of the wind turbine generator inclining toward the upwind side, and functions advantageously in restriction of sway of the floating body. Thus, when the wind turbine generator is stopped by increasing the pitch angle of the blade and applying an aerodynamic braking force to the rotor of the wind turbine generator, a rapid increase in the pitch angle of the blade during the first period means a decrease in the factor for reducing the acceleration of the wind turbine generator toward the upwind side, which may possibly amplify the sway of the floating body. On the other hand, in the second period, during which the wind turbine generator is in an inclining motion toward the downwind side from the vertical direction, the thrust force received by the rotor from wind is a factor that increases the acceleration of the wind turbine generator toward the downwind side, and functions disadvantageously in restriction of sway of the floating body. Thus, when the wind turbine generator is stopped by increasing the pitch angle of the blade and applying an aerodynamic braking force to the rotor of the wind turbine generator, a rapid increase in the pitch angle of the blade during the second period means a decrease in the factor for increasing the acceleration of the wind turbine generator toward the downwind side, which may possibly contribute to restriction of the sway of the floating body.

According to the above method of controlling a floating-body wind turbine power generating apparatus, in view of the above relationship between sway of the floating body and the aerodynamic thrust force received by the rotor, the pitch angle change rates (increasing speed) are varied between the first period and the second period, between which the attitude and the inclination motion direction of the wind turbine generator due to sway of the floating body are different. Specifically, with the first change rate (increasing speed) of the pitch angle in the first period being smaller than the second change rate (increasing speed) of the pitch angle in the second period, it is possible to restrict a decrease in the aerodynamic thrust force in the first period, which functions advantageously in restriction of the sway of the floating body, as well as to promote a decrease in the aerodynamic thrust force of the second period, which functions disadvantageously in restriction of the sway of the floating body. Thus, it is possible to stop the wind turbine generator while restricting sway of the floating body.

In some embodiments, in the pitch-angle increasing step, a change rate of the pitch angle of the blade in a total period during which the wind turbine generator is in the inclining motion toward the upwind side, is smaller than a change rate of the pitch angle of the blade in a total period during which the wind turbine generator is in the inclining motion toward the downwind side.

In the total period during which the wind turbine generator is in an inclining motion toward the upwind side, the thrust force received by the rotor front wind contributes to restriction of the inclining motion of the wind turbine generator toward the upwind side associated with the sway of the floating body. On the other hand, in the total period during which the wind turbine generator is in an inclining motion toward the downwind side, the thrust force received by the rotor from wind promotes the inclining motion of the wind turbine generator toward the downwind side associated with the sway of the floating body. In view of this, when the wind turbine generator is stopped by the pitch control, if the direction of the inclining motion of the wind turbine generator is taken into account and the change rate (increasing speed) of the pitch angle is reduced in the total period during which the wind turbine generator is in an inclining motion toward the upwind side as compared to that in the total period during which the wind turbine generator is in an inclining motion toward the downwind side, it is possible to stop the wind turbine generator while effectively restricting sway of the floating body. In other words, it is possible to restrict a decrease in the aerodynamic thrust force, which functions advantageously in restriction of the inclining motion (the sway of the floating body), in the total period during which the wind turbine generator is in an inclining motion toward the upwind side, as well as to promote a decrease in the aerodynamic thrust force, which functions disadvantageously in restriction of the inclining motion (the sway of the floating body) in the total period during which the wind turbine generator is in an inclining motion toward the downwind side.

In some embodiments, in the pitch-angle increasing step, the change rate of the pitch angle of the blade in a total period during which the wind turbine generator has an inclined attitude toward the upwind side, is smaller than the change rate of the pitch angle of the blade in a total period during which the wind turbine generator has an inclined attitude toward the downwind side.

In the floating-body wind turbine power generating apparatus, it is desirable to maintain the attitude of the wind turbine generator to be as vertical as possible (hereinafter, referred to as "vertical attitude"). In this regard, when the wind turbine generator is stopped by the pitch control, it is possible to promote a motion of the wind turbine generator for returning to the vertical attitude, if the attitude of the wind turbine generator 1 is taken into account and the change rate (increasing speed) of the pitch angle is reduced in the total period during which the wind turbine generator is in an inclined attitude toward the upwind side as compared to that in the total period during which the wind turbine generator is in an inclined attitude toward the downwind side. That is, it is possible to restrict a decrease in the aerodynamic thrust force that promotes the motion of the wind turbine generator for returning to the vertical attitude in the total period during which the wind turbine generator is in the inclined attitude toward the upwind side, as well as to promote a decrease in the aerodynamic thrust force that interrupts the motion the wind turbine generator for returning to the vertical attitude in the total period during which the wind turbine generator is in the inclined attitude toward the downwind side.

In some embodiments, in the pitch-angle increasing step, the change rate of the pitch angle is monotonically increased from the first change rate to the second change rate upon transition from the first period to the second period, and the change rate of the pitch angle is monotonically decreased from the second change rate to the first change rate upon transition from the second period to the first period.

As described above, upon transition from the first period to the second period, the pitch angle change rate is monotonically increased from the first change rate to the second change rate, and upon transition from the second period to the first period, the pitch angle change rate is monotonically decreased from the second change rate to the first change rate, which makes it possible to smoothly stop the wind turbine generator by the pitch control.

In some embodiments, the method further includes a pitch-angle decreasing step of decreasing the pitch angle of the blade when the wind turbine generator is started, so that a lift applied to the blade of the wind turbine generator increases. In the pitch-angle decreasing step, a third change rate of the pitch angle of the blade in a third period during which the wind turbine generator is in the inclining motion toward the upwind side from the vertical direction due to the sway of the floating body, is larger than a fourth change rate of the pitch angle of the blade in a fourth period during which the wind turbine generator is in the inclining motion toward the downwind side from the vertical direction due to the sway of the floating body.

When the wind turbine generator is started, in the third period, during which the wind turbine generator is in an inclining motion toward the upwind side from the vertical direction, the thrust force received by the rotor from wind is a factor that reduces the acceleration of the wind turbine generator toward the upwind side, and functions advantageously in restriction of sway of the floating body, similarly to the above first period. Thus, when the wind turbine generator is started by decreasing the pitch angle of the blade and increasing a lift applied to the blade, a rapid decrease in the pitch angle of the blade during the third period means an increase in the factor for reducing the acceleration of the wind turbine generator toward the upwind side, which may possibly contribute to restriction of the sway of the floating body. On the other hand, in the fourth period, during which the wind turbine generator is in an inclining motion toward the downwind side from the vertical direction, the thrust force received by the rotor from wind is a factor that increases the acceleration of the wind turbine generator toward the downwind side, and functions disadvantageously in restriction of sway of the floating body, similarly to the above second period. Thus, when the wind turbine generator is started by decreasing the pitch angle of the blade and increasing a lift applied to the blade, a rapid decrease in the pitch angle of the blade during the fourth period means an increase in the factor for increasing the acceleration of the wind turbine generator toward the downwind side, which may amplify the sway of the floating body.

Thus, in the above method of controlling a floating-body wind turbine generating apparatus, with the third change rate (decreasing speed) of the pitch angle in the third period being larger than the fourth change rate (decreasing speed) of the pitch angle in the fourth period, it is possible to promote an increase in the aerodynamic thrust force of the third period, which functions advantageously in restriction of the sway of the floating body, as well as to restrict an increase in the aerodynamic thrust force of the fourth period, which functions disadvantageously in restriction of the sway of the floating body. Thus, it is possible to start the wind turbine generator while restricting sway of the floating body.

In some embodiments, in the pitch-angle decreasing step, a change rate of the pitch angle of the blade in the total period during which the wind turbine generator is in the inclining motion toward the upwind side, is larger than a change rate of the pitch angle of the blade in the total period during which the wind turbine generator is in the inclining motion toward the downwind side.

When the wind turbine generator is started by the pitch control, if the direction of the inclining motion of the wind turbine generator is taken into account and the change rate (decreasing speed) of the pitch angle is increased in the total period during which the wind turbine generator is in an inclining motion toward the upwind side as compared to that in the total period during which the wind turbine generator is in an inclining motion toward the downwind side, it is possible to start the wind turbine generator while effectively restricting sway of the floating body. Specifically, it is possible to promote an increase in the aerodynamic thrust force, which functions advantageously in restriction of the inclining motion (the sway the floating body) in the total period during which the wind turbine generator is in an inclining motion toward the upwind side, as well as to restrict an increase in the aerodynamic thrust force, which functions disadvantageously in restriction of the inclining motion (the sway of the floating body) in the total period during which the wind turbine generator is in an inclining motion toward the downwind side.

In some embodiments, in the pitch-angle decreasing step, the change rate of the pitch angle of the blade in the total period during which the wind turbine generator has the inclined attitude toward the upwind side, is larger than the change rate of the pitch angle of the blade in the total period during which the wind turbine generator has the inclined attitude toward the downwind side.

When the wind turbine generator is started by the pitch control, it is possible to promote a motion of the wind turbine generator for returning to the vertical attitude, if the attitude of the wind turbine generator is taken into account and the change rate (decreasing speed) of the pitch angle is increased in the total period during which the wind turbine generator is in an inclined attitude toward the upwind side as compared to that in the total period during which the wind turbine generator is in an inclined attitude toward the downwind side. That is, it is possible to promote an increase in the aerodynamic thrust force that promotes the motion of the wind turbine generator for returning to the vertical attitude in the total period during which the wind turbine generator is in the inclined attitude toward the upwind side, as well as to restrict an increase in the aerodynamic thrust force that interrupts the motion of the wind turbine generator for returning to the vertical attitude in the total period during which the wind turbine generator is in the inclined attitude toward the downwind side.

In some embodiments, in the pitch-angle decreasing step, the change rate of the pitch angle is monotonically decreased from the third change rate to the fourth change rate upon transition from the third period to the fourth period, and the change rate of the pitch angle is monotonically increased from the fourth change rate to the third change rate upon transition from the fourth period to the third period.

As described above, upon transition from the third period to the fourth period, the pitch angle change rate is monotonically decreased from the third change rate to the fourth change rate. Also, upon transition from the fourth period to the third period, the pitch angle change rate is monotonically increased from the fourth change rate to the third change rate, which makes it possible to smoothly start the wind turbine generator by the pitch control while restricting sway of the floating body.

A method of controlling a floating-body wind turbine power generating apparatus according to at least one embodiment of the present invention is for a floating-body wind turbine power generating apparatus including a wind turbine generator disposed on a floating body. The method includes a pitch-angle decreasing step of decreasing a pitch angle of a blade of the wind turbine generator when the wind turbine generator is started, so that a lift applied to the blade of the wind turbine generator increases. In the pitch-angle decreasing step, a third change rate of the pitch angle of the blade in a third period during which the wind turbine generator is in an inclining motion toward an upwind side from a vertical direction due to sway of the floating body, is larger than a fourth change rate of the pitch angle of the blade in a fourth period during which the wind turbine generator is in an inclining motion toward a downwind side from the vertical direction due to the sway of the floating body.

In the above method of controlling a floating-body wind turbine generating apparatus, when the wind turbine generator is started, the third change rate (decreasing speed) of the pitch angle in the third period, during which the wind turbine generator is in an inclining motion toward the upwind side from the vertical direction, is larger than the fourth change rate (decreasing speed) of the pitch angle in the fourth period, during which the wind turbine generator is in an inclining motion toward the downwind side from the vertical direction. In this way, it is possible to promote an increase in the aerodynamic thrust force of the third period, which functions advantageously in restriction of the sway of the floating body, as well as to restrict an increase in the aerodynamic thrust force of the fourth period, which functions disadvantageously in restriction of the sway of the floating body. Thus, it is possible to start the wind turbine generator while restricting sway of the floating body.

A floating-body wind turbine power generating apparatus according to at least one embodiment of the present invention includes: a floating body; a wind turbine generator disposed on the floating body, the wind turbine generator including a rotor in which a blade is mounted to a hub, and a pitch adjustment mechanism for adjusting a pitch angle of the blade; and a pitch control part for controlling the pitch adjustment mechanism so that an aerodynamic braking force is applied to the rotor by an increase in the pitch angle when the wind turbine generator is stopped. The pitch control part is configured to control a first change rate of the pitch angle of the blade in a first period during which the wind turbine generator is in an inclining motion toward an upwind side from a vertical direction due to sway of the floating body to be smaller than a second change rate of the pitch angle of the blade in a second period during which the wind turbine generator is in an inclining motion toward a downwind side from the vertical direction due to the sway of the floating body.

According to the above floating-body wind turbine power generating apparatus, when the wind turbine generator is stopped, the first change rate (increasing speed) of the pitch angle in the first period is smaller than the second change rate (increasing speed) of the pitch angle in the second period. In this way, it is possible to restrict a decrease in the aerodynamic thrust force of the first period, which functions advantageously in restriction of the sway of the floating body, as well as to promote a decrease in the aerodynamic thrust force of the second period, which functions disadvantageously in restriction of the sway of the floating body. Thus, it is possible to stop the wind turbine generator while restricting sway of the floating body.

A floating-body wind turbine power generating apparatus according to at least one embodiment of the present invention includes: a floating body; a wind turbine generator disposed on the floating body, the wind turbine generator including a rotor in which a blade is mounted to a hub, and a pitch adjustment mechanism for adjusting a pitch angle of the blade; and a pitch control part for controlling the pitch adjustment mechanism so that a lift applied to the blade is increased by a decrease in the pitch angle when the wind turbine generator is started. The pitch control part is configured to control a third change rate of the pitch angle of the blade in a third period during which the wind turbine generator is in an inclining motion toward an upwind side from a vertical direction due to sway of the floating body to be larger than a fourth change rate of the pitch angle of the blade in a fourth period during which the wind turbine generator is in an inclining motion toward a downwind side from the vertical direction due to the sway of the floating body.

According to the above floating-body wind turbine power generating apparatus, when the wind turbine generator is started, the third change rate (decreasing speed) of the pitch angle in the third period, during which the wind turbine generator is in an inclining motion toward the upwind side from the vertical direction, is larger than the fourth change rate (decreasing speed) of the pitch angle in the fourth period, during which the wind turbine generator is in an inclining motion toward the downwind side from the vertical direction. In this way, it is possible to promote an increase in the aerodynamic thrust force of the third period, which functions advantageously in restriction of the sway of the floating body, as well as to restrict an increase in the aerodynamic thrust force of the fourth period, which functions disadvantageously in restriction of the sway of the floating body. Thus, it is possible to start the wind turbine generator while restricting sway of the floating body.

A control device for a floating-body wind turbine power generating apparatus according to at least one embodiment of the present invention is for a floating-body wind turbine power generating apparatus including a wind turbine generator disposed on a floating body. The wind turbine generator includes a rotor in which a blade is mounted to a hub and a pitch adjustment mechanism for adjusting a pitch angle of the blade. The control device includes a pitch control part for controlling the pitch adjustment mechanism so that an aerodynamic braking force is applied to the rotor by an increase in the pitch angle when the wind turbine generator is stopped. The pitch control part is configured to control a first change rate of the pitch angle of the blade in a first period during which the wind turbine generator is in an inclining motion toward an upwind side from a vertical direction due to sway of the floating body to be smaller than a second change rate of the pitch angle of the blade in a second period during which the wind turbine generator is in an inclining motion toward a downwind side from the vertical direction due to the sway of the floating body.

According to the above control device for a floating-body wind turbine power generating apparatus, when the wind turbine generator is stopped, the first change rate (increasing speed) of the pitch angle in the first period is smaller than the second change rate (increasing speed) of the pitch angle in the second period. In this way, it is possible to restrict a decrease in the aerodynamic thrust force of the first period, which functions advantageously in restriction of the sway of the floating body, as well as to promote a decrease in the aerodynamic thrust force of the second period, which functions disadvantageously in restriction of the sway of the floating body. Thus, it is possible to stop the wind turbine generator while restricting sway of the floating body.

A control device for a floating-body wind turbine power generating apparatus according to at least one embodiment of the present invention is for a floating-body wind turbine power generating apparatus including a wind turbine generator disposed on a floating body. The wind turbine generator includes a rotor in which a blade is mounted to a hub and a pitch adjustment mechanism for adjusting a pitch angle of the blade. The control device includes a pitch control part for controlling the pitch adjustment mechanism so that a lift applied to the blade is increased by a decrease in the pitch angle when the wind turbine generator is started. The pitch control part is configured to control a third change rate of the pitch angle of the blade in a third period during which the wind turbine generator is in an inclining motion toward an upwind side from a vertical direction due to sway of the floating body to be larger than a fourth change rate of the pitch angle of the blade in a fourth period during which the wind turbine generator is in an inclining motion toward a downwind side from the vertical direction due to the sway of the floating body.

According to the above control device for a floating-body wind turbine power generating apparatus, when the wind turbine generator is started, the third change rate (decreasing speed) of the pitch angle in the third period is larger than the fourth change rate (decreasing speed) of the pitch angle in the fourth period. In this way, it is possible to promote an increase in the aerodynamic thrust force of the third period, which functions advantageously in restriction of the sway of the floating body, as well as to restrict an increase in the aerodynamic thrust force of the fourth period, which functions disadvantageously in restriction of the sway of the floating body. Thus, it is possible to start the wind turbine generator while restricting way of the floating body.

Advantageous Effects

According to at least one embodiment of the present invention, when the wind turbine generator is stopped, it is possible to restrict a decrease in the aerodynamic thrust force of the first period, which functions advantageously in restriction of the sway of the floating body, as well as to promote a decrease in the aerodynamic thrust force of the second period, which functions disadvantageously in restriction of the sway of the floating body. Thus, it is possible to stop the wind turbine generator while restricting sway of the floating body.

BRIEF DESCRIPTION OF DRAWINGS

FIGS. 3A to 3C are diagrams for describing a pitch control upon stoppage of a wind turbine generator according to an embodiment of the present embodiment, illustrating a temporal change of the pitch angle, a temporal change of an inclination angle change rate of the wind turbine generator, and a motion of the wind turbine generator, respectively.

FIGS. 9A to 9C are diagrams for describing a pitch control upon start of a wind turbine generator according to an embodiment of the present embodiment, illustrating a temporal change of the pitch angle, a temporal change of the inclination angle change rate of the wind turbine generator, and a motion of the wind turbine generator, respectively.

FIGS. 12A to 12C are diagrams for describing a pitch control upon start of a wind turbine generator according to another embodiment of the present embodiment, illustrating a temporal change of the pitch angle, a temporal change of the inclination angle change rate of the wind turbine generator, and a motion of the wind turbine generator, respectively.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
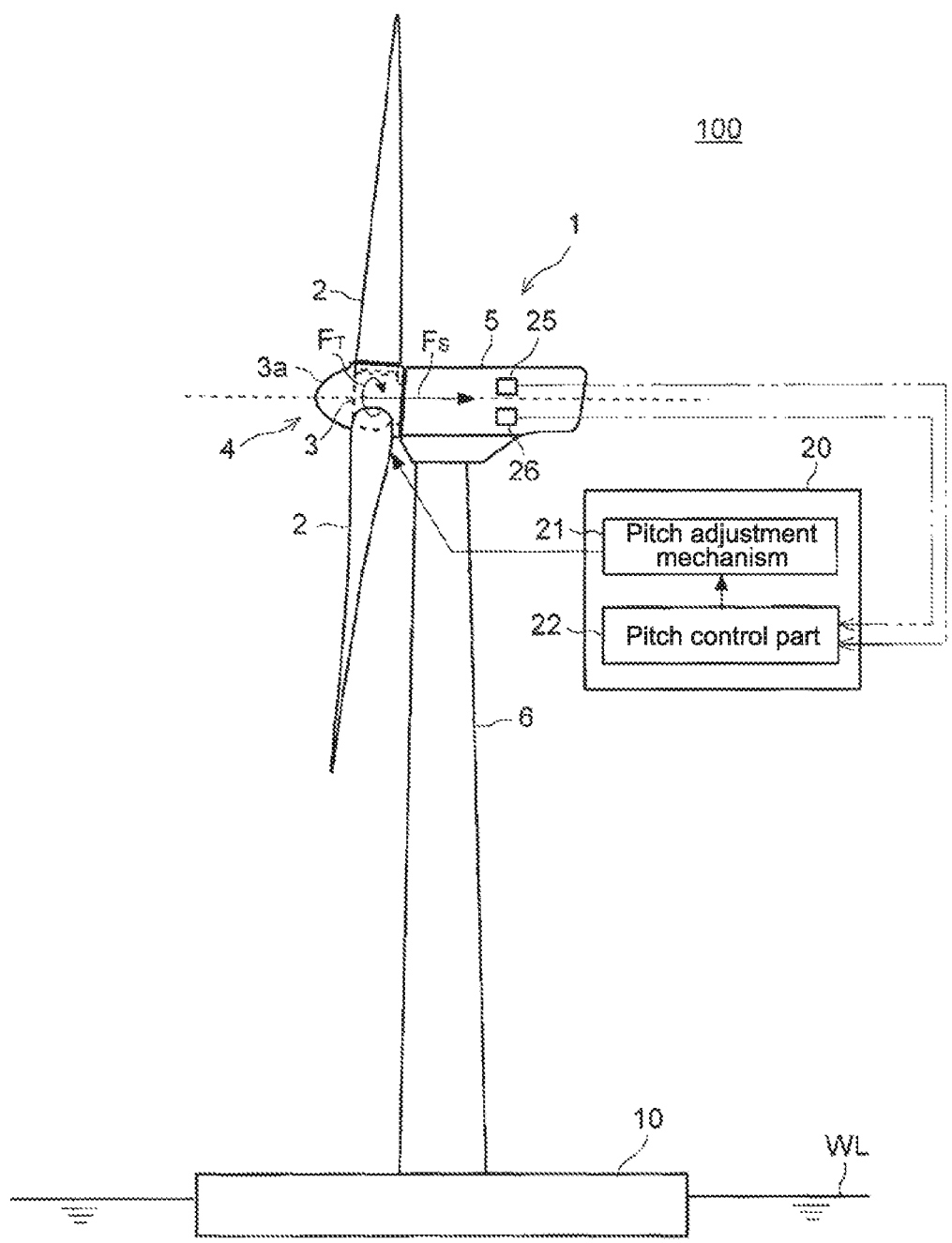
FIG. 1 is a diagram of an overall configuration of a floating-body wind turbine power generating apparatus according to an embodiment of the present invention.
Figure 2:
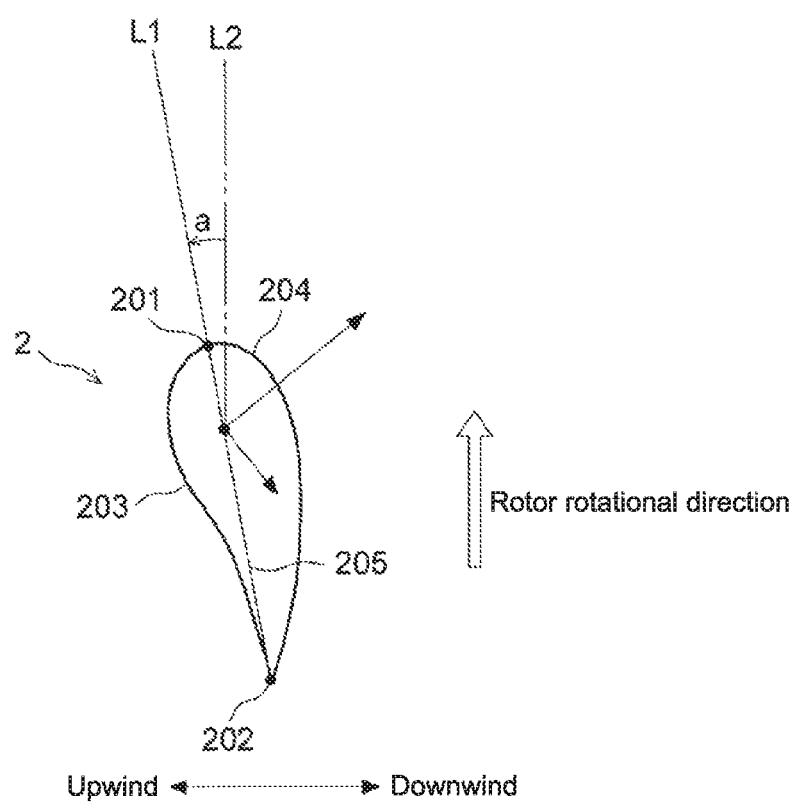
FIG. 2 is a cross-sectional view of a blade for describing a pitch angle.

FIG. 1 is a diagram of an overall configuration of a wind turbine power generating apparatus according to one embodiment.

As illustrated in FIG. 1, in one embodiment, a floating-body wind turbine power generating apparatus 100 includes a wind turbine generator 1, a floating body 10 on which the wind turbine generator 1 is built, and a control device 20 for controlling the wind turbine generator 1.

The wind turbine generator 1 includes a rotor 4 including at least one blade 2 and a hub 3, a nacelle 5 rotatably supporting the rotor 4, and a tower 6 supporting the nacelle 5. The hub 3 may be covered by a hub cover 3a.

The rotor 4 may be coupled to a generator via a drivetrain (not illustrated). The drivetrain may include a main shaft coupled to the hub 3 and a speed increasing unit a hydraulic transmission or a gearbox) for increasing rotational speed of the main shaft and inputting the rotation to a generator. Alternatively, a generator may be directly connected to the hub 3 of the rotor 4. The blade 2 receives wind and the rotor 4 rotates so that electric power is generated in the generator.

Further, the floating-body wind turbine power generating apparatus 100 may include various sensors such as an acceleration sensor 25 and an attitude detection sensor 26 mounted to the hub 3, the nacelle 5, or an upper part of the tower 6.

The nacelle 5 may be capable of yaw rotating with respect to the tower 6. In one embodiment, the wind turbine generator 1 is an upwind wind turbine configured such that the nacelle 5 yaw rotates so that the blade 2 is oriented toward the upwind side in accordance with the wind direction during normal operation.

The floating body 10 has buoyance, and floats on the water. For instance, the floating body 10 is connected to an anchor by a mooring line to be moored on a predetermined position on the water. The tower 6 is disposed on the floating body 10. Although the drawings illustrate a simplified floating body, various floating bodies can be employed, such as a semi-sub type and a spar type.

The control device 20 includes a pitch adjustment mechanism 21 for adjusting a pitch angle of the blade 2, and a pitch control part 22 for controlling the pitch adjustment mechanism 21. The control device 20 receives signals inputted from the various sensors such as the acceleration sensor 25 and the attitude detection sensor 26. A pitch control may be performed on the blade 2 on the basis of inclination motion information or attitude information of the wind turbine generator 1 obtained from the above signals.

The pitch adjustment mechanism 21 may be disposed in the hub 3 and for each of the at least one blade 2. For instance, in a case where three blades 2 are provided, three pitch adjustment mechanisms 21 are provided. Each pitch adjustment mechanism 21 may individually adjust the pitch angle of the corresponding blade 2, or adjust the pitch angles of the entire blades 2 in cooperation.

The pitch control part 22 controls the pitch adjustment mechanism 21 so that an aerodynamic braking force is applied to the rotor 4 due to an increase in the pitch angle upon stoppage of the wind turbine generator. Further, the pitch control part 22 controls the pitch angle of the blade 2 to decrease so that a lift applied to the blade 2 increases, upon start of the wind turbine generator.

Here, the pitch angle of the blade 2 will be described with reference to FIG. 3.

As illustrated in FIG. 3, each blade 2 has an airfoil in which a pressure surface 203 and a suction surface 204 extend from a leading edge 201 to a trailing edge 202. A straight line 205 connecting the leading edge 201 and the trailing edge 202 is referred to as a chord.

Each blade 2 is oriented so that the chord 205 forms an angle "a" from the rotational direction of the rotor, by the pitch adjustment mechanism 21 operating under control of the pitch control part 22. This angle "a" is an angle between the extended line $L_1$ of the chord 205 and the straight line $L_2$ parallel to the rotational direction of the blade (the rotational plane of the rotor), indicating the pitch angle of the blade 2.

The pitch angle "a" of each blade 2 during normal operation of the wind turbine generator 1 is approximately zero degree, and this pitch angle is sometimes referred to as a fine position. On the other hand, the pitch angle "a" of each blade 2 during complete stoppage of the wind turbine generator 1 is approximately 90 degrees (the maximum angle), and this pitch angle is sometimes referred to as a feather position. When the pitch angle "a" of each blade 2 is increased from a fine position (approximately 0 degree) to the feather position (approximately 90 degrees), an aerodynamic braking force is applied to the rotor 4, so that the rotational speed of the rotor 4 decreases. On the other hand, when the pitch angle "a" of each blade 2 is reduced from the feather position (approximately 90 degrees) to the fine position (approximately zero degree), a lift applied to each blade 2 increases, so that the rotational speed of the rotor 4 rises.

Meanwhile, in a case of an onshore wind turbine power generating apparatus or a bottom-mounted offshore wind turbine power generating apparatus, a rotor of a wind turbine generator moves back and forth to a certain extent in accordance with vibration of a tower. The cycle of the vibration of the tower in this case is short enough as compared to the time the influence of the change in the pitch angle due to rotation of the blade by the pitch adjustment mechanism requires to substantially appear as a change in the thrust force. Thus, even if a thrust force received by the rotor from wind is varied by the pitch control, the influence is barely recognizable in the vibration of the tower.

In contrast, in a typical floating-body wind turbine power generating apparatus, the sway cycle of a floating body is approximately 10 seconds. Thus, before the attitude of the wind turbine generator 1 varies between the maximum inclined state to the downwind side and the maximum inclined state to the upwind side, the influence of varying the pitch angle by rotating the blade 2 with the pitch adjustment mechanism 21 can substantially appear as a change in the thrust force. Thus, if a thrust force received by the rotor 4 from wind is varied by the pitch control, sway of the floating body 10 would be also affected.

In view of this, in some embodiments, the pitch control is performed upon stoppage and start of the wind turbine generator 1 taking account of the above relationship between the sway of the floating body 10 and the aerodynamic thrust force received by the rotor 4.

Described below in detail is the pitch control for the blade 2 performed by the pitch control part 22 upon stoppage and start of the wind turbine generator 1 illustrated in FIG. 1.

(Pitch Control Upon Stoppage of the Wind Turbine Generator)

Figure 4A:
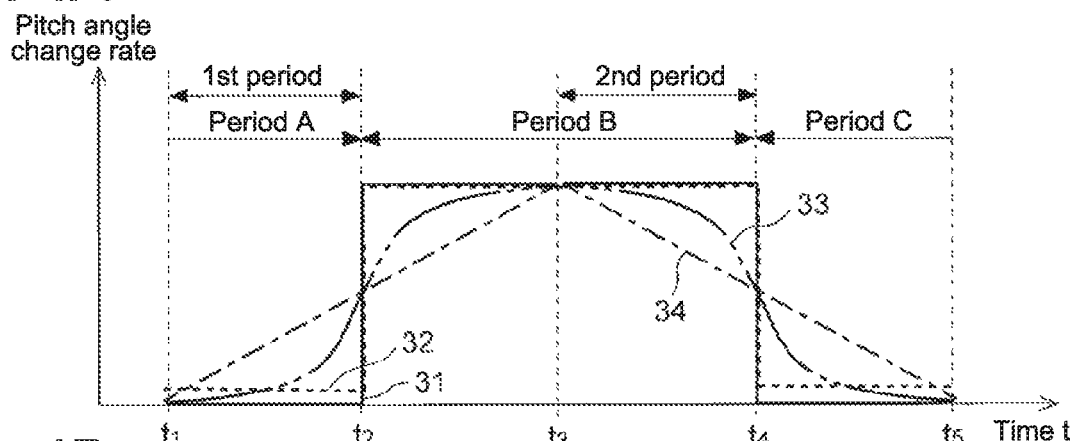
FIGS. 4A and 4B are diagrams for describing a pitch control upon stoppage of a wind turbine generator according to an embodiment of the present embodiment, illustrating a pitch angle change rate and a motion of the wind turbine generator, respectively.
Figure 4B:
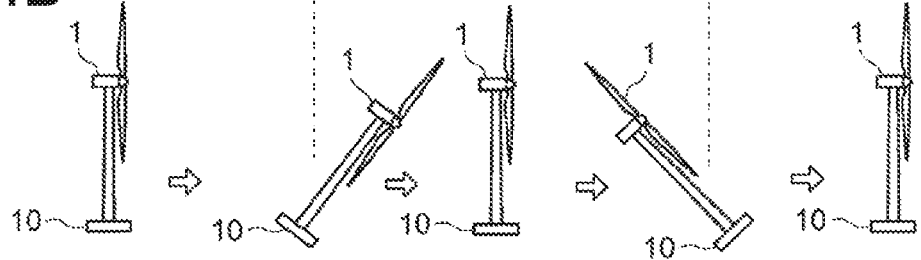
Figure 5:
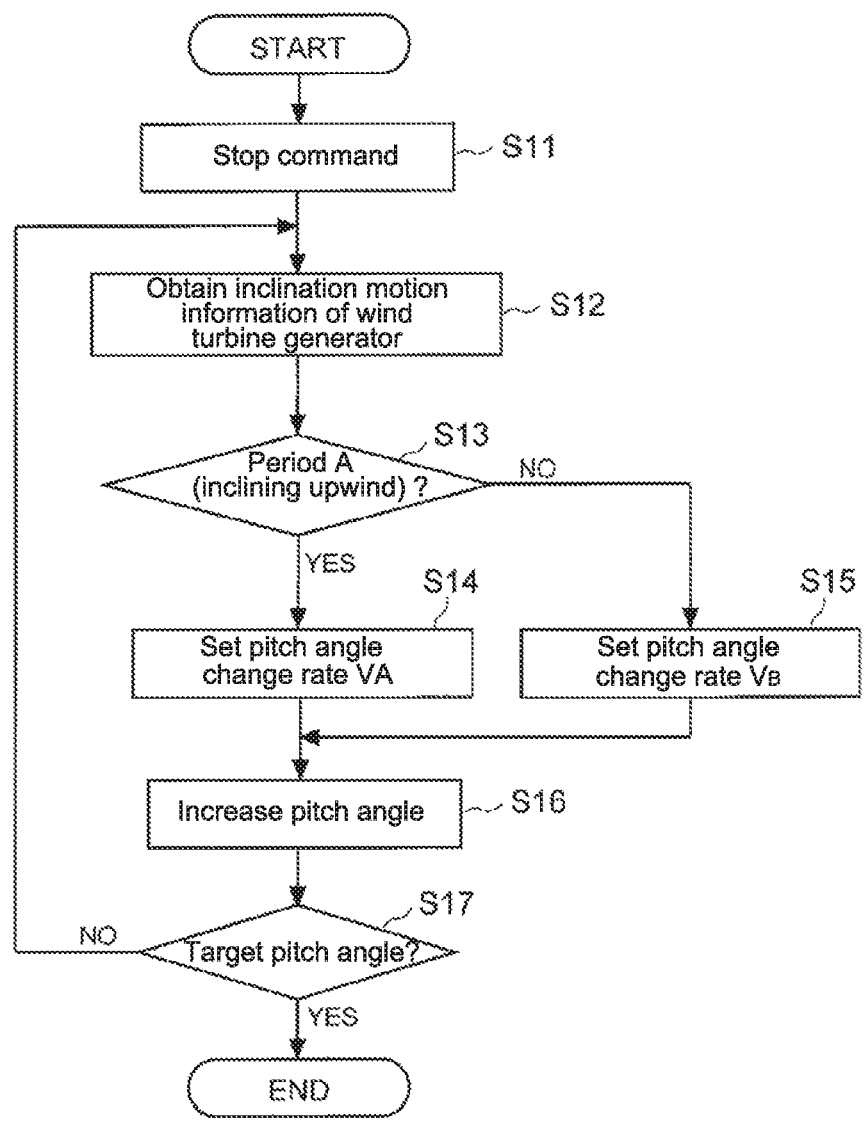
FIG. 5 is a flowchart for describing a pitch control when a wind turbine generator is stopped according to an embodiment of the present embodiment.

FIGS. 3A to 3C are diagrams for describing a pitch control upon stoppage of a wind turbine generator according to an embodiment of the present embodiment, illustrating a temporal change of the pitch angle, a temporal change of an inclination angle change rate of the wind turbine generator, and a motion of the wind turbine generator, respectively. FIGS. 4A and 4B are diagrams for describing a pitch control upon stoppage of a wind turbine generator according to an embodiment of the present embodiment, illustrating a pitch angle change rate of the wind turbine generator and a motion of the wind turbine generator, respectively. FIG. 5 is a flowchart for describing a pitch control upon stoppage of a wind turbine generator according to an embodiment of the present embodiment. Here, reference signs for the components in the following description are identical to those of the floating-body wind turbine power generating apparatus 100 illustrated in FIG. 1.

With reference to FIGS. 3A to 4B, a motion of the wind turbine generator 1 caused by sway of the floating body 10 will be described.

As illustrated in FIGS. 3C and 4B, sway of the floating body 10 inclines the wind turbine generator 1 back and forth (toward the upwind side and the downwind side). The back-and-forth inclination motion of the wind turbine generator 1 is repeated, but only one section (one cycle) corresponding to one back-and-forth inclination motion of the repeated motion is extracted and illustrated in FIGS. 3A to 4B. That is, the drawings illustrate: time $t_1$ when the wind turbi generator 1 is in the vertical direction (hereinafter, referred to as the vertical attitude); time $t_2$ when the wind turbine generator 1 is in the foremost inclined attitude as a result of the inclining motion to die upwind side; time $t_3$ when the wind turbine generator 1 returns to the vertical attitude due to the inclining motion toward the downwind side; time $L_1$ when the wind turbine generator 1 is in the rearmost inclined attitude as a result of the inclining motion to the downwind side; and time $t_2$, when the wind turbine generator 1 returns to the vertical attitude as a result of the inclining motion toward the upwind side.

FIG. 3B illustrates a temporal change of the inclination angle change rate of the wind turbine generator 1 corresponding to the above inclining motion.

In FIG. 3B, the inclination angle change rate (inclination velocity) toward the upwind side of the wind turbine generator 1 is indicated as negative, and the inclination angle change rate (inclination velocity) toward the downwind side is indicated as positive. The inclination angle change rate of the wind turbine generator 1 reaches its minimum at time $t_1$, when the wind turbine generator 1 is inclining from the downwind side toward the upwind side and in the vertical attitude, and becomes zero at time $t_2$, when the wind turbine generator 1 is in the foremost inclined attitude. Further, the inclination angle change rate reaches it maximum at time $t_3$, when the wind turbine generator 1 is inclining from the forward inclined attitude to the downwind side and in the vertical attitude, and becomes zero at time $t_4$ when the wind turbine generator 1 is in the rearmost inclined attitude.

Next, the pitch control of the blade 2 corresponding to the above operation of the wind turbine generator 1 will be described.

FIG. 3A illustrates a temporal change of the pitch angle of the blade 2 of the wind turbine generator 1. Once a stop command is inputted to the pitch control part 22, the pitch control part 22 controls the pitch adjustment mechanism 21 to increase the pitch angle of the blade 2, so that an aerodynamic braking force is applied to the rotor 4. That is, the pitch angle is set at the fine position side during normal operation so that a lift is applied to the blade 2, and thus the pitch angle is shifted from the fine position side to the feather position side when the blade 2 is stopped. As illustrated in FIG. 1, a thrust force $F_s$ and a torque $F_t$ corresponding to the pitch angle are applied to the rotor 4 due to the actual wind velocity and the wind velocity caused by sway of the floating body 10.

In one embodiment, the pitch control part 22 calculates a command value of the pitch angle change rate (pitch rate) of the blade 2 and provides the command value to the pitch adjustment mechanism 21 until the pitch angle of the blade 2 reaches a target pitch angle (e.g. maximum angle), when the pitch angle of the blade 2 is increased. FIG. 4A illustrates pitch angle change rate curves, each of which is time-series data of a command value given to the pitch adjustment mechanism 21. In the drawing, four types of pitch angle change rate curves 31 to 34 are illustrated. The pitch angle change rate curve 31 indicated by a solid line corresponds to the pitch angle of FIG. 3A.

Here, in the first period, during which the wind turbine generator 1 is in an inclining motion toward the upwind side from the vertical direction, i.e., the period from time $t_1$ to time $t_2$, the thrust force received by the rotor 4 from wind is a factor that reduces the acceleration of the wind turbine generator 1 toward the upwind side, and functions advantageously in restriction of sway of the floating body 10. Thus, when the wind turbine generator 1 is stopped by increasing the pitch angle of the blade 2 and applying an aerodynamic braking force to the rotor 4 of the wind turbine generator 1, a rapid increase in the pitch angle of the blade 2 during the first period means a decrease in the factor for reducing the acceleration of the wind turbine generator 1 toward the upwind side, which may possibly amplify the sway of the floating body 10. On the other hand, in the second period, during which the wind turbine generator 1 is in an inclining motion toward the downwind side from the vertical direction, the thrust force received by the rotor 4 from wind is a factor that increases the acceleration of the wind turbine generator 1 toward the downwind side, and functions disadvantageously in restriction of sway of the floating body 10. Thus, when the wind turbine generator 1 is stopped by increasing the pitch angle of the blade 2 and applying an aerodynamic braking force to the rotor 4 of the wind turbine generator 1, a rapid increase in the pitch angle of the blade 2 during the second period means a decrease in the factor for increasing the acceleration of the wind turbine generator 1 toward the downwind side, which may possibly contribute to restriction of the sway of the floating body.

Accordingly, in some embodiments, the following pitch control is performed in view of the above relationship between sway of the floating body 10 and the aerodynamic thrust force received by the rotor 4.

Specifically, the pitch control part 22 increases the pitch angle of the blade 2 so that the first change rate (increasing speed) of the pitch angle of the blade 2 in the first period, during which the wind turbine generator 1 is in an inclining motion toward the upwind side from the vertical direction, is smaller than the second change rate (increasing speed) of the pitch angle of the blade 2 in the second period, during which the wind turbine generator 1 is in an inclining motion toward the downwind side from the vertical direction. In the example illustrated in FIGS. 3A and 4A, the pitch angle is changed in accordance with the pitch angle change rate curve 31. That is, the pitch angle change rate is set to zero in the first period from time $t_1$ to time $t_2$ so as to keep the pitch angle constant, and the pitch angle change rate is set to a value greater than zero in the second period from time $t_3$ to time $t_4$ so as to increase the pitch angle at a constant rate.

As described above, with the first change rate (increasing speed) of the pitch angle in the first period being smaller than the second change rate (increasing speed) of the pitch angle in the second period, it is possible to restrict a decrease in the aerodynamic thrust force of the first period, which functions advantageously in restriction of the sway of the floating body, as well as to promote a decrease in the aerodynamic thrust force in the second period, which functions disadvantageously in restriction of the sway of the floating body. Thus, it is possible to stop the wind turbine generator 1 while restricting sway of the floating body.

In one embodiment, as illustrated in FIGS. 3A and 4A, the pitch control part 22 may control the pitch adjustment mechanism 21 to increase the pitch angle of the blade 2 so that the change rate of the pitch angle of the blade 2 in the total period (period A) during which the wind turbine generator 1 is in an inclining motion toward the upwind side, is smaller than the change rate of the pitch angle of the blade 2 in the total period (period B) during which the wind turbine generator 1 is in an inclining motion toward the downwind side. In the exemplary embodiment illustrated in FIGS. 3A and 4A, the pitch angle is changed in accordance with the pitch angle change rate curve 31, That is, the pitch angle change rate is set to zero in the period A from time $t_1$ to time $t_2$ and time $t_4$ to time $t_5$, and the pitch angle change rate is set to a value greater than zero in the period B from time $t_2$ to time $t_4$.

In the total period (period A) during which the wind turbine generator 1 is in an inclining motion toward the upwind side, the thrust force received by the rotor 4 from wind contributes to restriction of the inclining motion of the wind turbine generator 1 toward the upwind side associated with the sway of the floating body 10. On the other hand, in the total period (period B) during which the wind turbine generator 1 is in an inclining motion toward the downwind side, the thrust force received by the rotor 4 from wind promotes the inclining motion of the wind turbine generator 1 toward the downwind side associated with the sway of the floating body 10. In view of this, when the wind turbine generator is stopped by the pitch control, if the direction of the inclining motion of the wind turbine generator 1 is taken into account and the change rate (increasing speed) of the pitch angle is reduced in the total period (period A) during which the wind turbine generator 1 is in an inclining motion toward the upwind side as compared to that in the total period (period B) during which the wind turbine generator 1 is in an inclining motion toward the downwind side, it is possible to stop the wind turbine generator 1 while effectively restricting sway of the floating body. In other words, it is possible to restrict a decrease in the aerodynamic thrust force, which functions advantageously in restriction of the inclining motion (the sway of the floating body) in the total period (period A) during which the wind turbine generator 1 is in an inclining motion toward the upwind side, as well as to promote a decrease in the aerodynamic thrust force, which functions disadvantageously in restriction of the inclining motion (the sway of the floating body) in the total period (period B) during which the wind turbine generator 1 is in an inclining motion toward the downwind side.

In some embodiments, at time $t_2$, when the wind turbine generator 1 is inclined to the foremost position, and at time $t_4$, when the wind turbine generator 1 is inclined to the rearmost position, the pitch angle change rate is varied in a stepped pattern between the pitch angle change rate $V_A$ of the period A and the pitch angle change rate $V_B$ ($>V_A$) of the period B.

In one embodiment, in accordance with the pitch angle change rate curve 31 illustrated in FIG. 4A, the pitch angle change rate is varied in a stepped pattern between the pitch angle change rate $V_A$ (=0) of the period A and the pitch angle change rate $V_B$ (>0) of the period B. In another embodiment, accordance with the pitch angle change rate curve 32 in FIG. 4A, the pitch angle change rate is varied in a stepped pattern between the pitch angle change rate $V_A$ of the period A, which is greater than zero, and the pitch angle change rate $V_B$ ($>V_A$) of the period B.

In yet another embodiment, in accordance with the pitch angle change rate curves 33, 34 in FIG. 4A, at least one of the pitch angle change rate $V_A$ of the period A including the first period or the pitch angle change rate $V_B$ of the period B including the second period may be set on the basis of an optional function F(t). That is, the pitch angle change rate $V_A$ or the pitch angle change rate $V_B$ may be varied continuously with time.

In some embodiments, upon transition from the first period to the second period, the pitch angle change rate is monotonically increased from the first change rate to the second change rate. Also, upon transition from the second period to the first period, the pitch angle change rate is monotonically decreased from the second change rate to the first change rate.

As described above, upon transition from the first period to the second period, the pitch angle change rate is monotonically increased from the first change rate to the second change rate, and upon transition from the second period to the first period, the pitch angle change rate is monotonically decreased from the second change rate to the first change rate, which makes it possible to smoothly stop the wind turbine generator 1 by the pitch control.

In this case, specifically, the pitch angle change rate may be increased or decreased in a stepped pattern as indicated by the above pitch angle change rate curves 31, 32. Alternatively, the pitch angle change rate may be increased or decreased gradually between the first period and the second period as indicated by the pitch angle change rate curves 33, 34.

In a case where the pitch angle change rate is increased or decreased in a stepped pattern, the pitch angle change rate may be increased in a stepped pattern at time $t_2$, when the wind turbine generator 1 is in the foremost inclined attitude, and the pitch angle change rate may be decreased in a stepper pattern at time $t_4$, when the wind turbine generator 1 is inclined to the rearmost inclined attitude, in accordance with the pitch angle change rate curves 31, 32. It is desirable to restrict a decrease in the thrust force so as to restrict the inclining motion of the wind turbine generator 1 to the front (upwind side) immediately before time $t_2$, when the wind turbine generator 1 is in the foremost inclined attitude, and to promote a decrease in the thrust force against the rotor 4 so as to reduce the inclining motion of the wind turbine generator 1 toward the rear (downwind side) immediately after time $t_2$. On the other hand, it is desirable to promote a decrease in the thrust force so as to reduce the inclining motion toward the rear (downwind side) of the wind turbine generator 1 immediately before time $t_4$, when the wind turbine generator 1 is in the rearmost inclined attitude, and to restrict a decrease in the thrust force against the rotor 4 so as to restrict the inclining motion of the wind turbine generator 1 to the front (upwind side) immediately after time $t_4$. That is, at time $t_2$, when the wind turbine generator 1 is in the foremost inclined attitude and at time $t_4$, when the wind turbine generator 1 is in the rearmost inclined attitude, demands for the thrust force before and after the time are totally opposite to each other. Thus, changing the pitch angle change rate at time $t_2$ and time $t_4$ in a stepped pattern makes it possible to smoothly stop the wind turbine generator 1 while restricting sway of the floating body 10 more effectively.

In a case where the pitch angle change rate is gradually increased or decreased, as indicated by the pitch angle change rate curve 33, the pitch angle change rate may be increased linearly from time when the wind turbine generator 1 is in the vertical attitude, to time $t_3$, when the wind turbine generator 1 has inclined toward the front (upwind side) to return to the vertical attitude, and may be decreased linearly from time $t_3$ to time $t_5$, when the wind turbine generator 1 has inclined to the rear (downwind side) to return to the vertical attitude. Alternatively, as indicated by the pitch angle change rate curve 34, the pitch angle change rate may be increased in a curve from time $t_1$, when the wind turbine generator 1 is in the vertical attitude, to time $t_3$, when the wind turbine generator 1 has inclined toward the front (upwind side) to return to the vertical attitude, and may be decreased in a curve from time $t_3$ to time $t_5$, when the wind turbine generator 1 has inclined to the rear (downwind side) to return to the vertical attitude.

Now, with reference to FIG. 5, the pitch control upon stoppage of the wind turbine generator 1 will be described. Here, described below is a case where the pitch control is performed on the blade 2 so that the pitch angle change rate of the blade 2 in the period A is smaller than the pitch angle change rate of the blade 2 in the period B, as illustrated in FIG. 3A to 4B.

As illustrated in FIG. 5, if a stop command is given to the pitch control part 22 of the wind turbine generator 1 (S11), inclining motion information of the wind turbine generator 1 is obtained (S12). Here, the inclining motion information may be an inclination angle change rate or an inclining direction of the wind turbine generator 1. Further, the inclination angle change rate or the inclining direction may be obtained from various sensors such as the acceleration sensor 25 and the attitude detection sensor.

Next, on the basis of the inclination motion information, it is determined whether a period corresponding to the current motion of the wind turbine generator 1 matches the period A in which the wind turbine generator 1 is inclining toward the upwind side (S13). If the period corresponding to the current motion of the wind turbine generator 1 is the period A, the pitch angle change rate $V_A$ is set (S14). If the period corresponding to the current motion of the wind turbine generator 1 is not the period A, the period is determined to be the period B, and the pitch angle change rate $V_B$ is set (S15). At this time, the pitch angle change rate $V_A$ is smaller than the pitch angle change rate $V_B$. Then, the pitch angle change rate $V_A$ or the pitch angle change rate $V_B$ having been set is inputted to the pitch adjustment mechanism 21 as a command value, and the pitch adjustment mechanism 21 increases the pitch angle of the blade 2 (S16). A target pitch angle (e.g. the maximum angle) is set for the pitch control part 22 in advance, and the pitch control part 22 determines whether the pitch angle of the blade 2 has reached the target pitch angle (S17). If the target pitch angle is reached, the pitch control is completed.

Next, with reference to FIGS. 6A to 8, a pitch control upon stoppage of turbine generator according to another embodiment will be described.

Figure 6A:
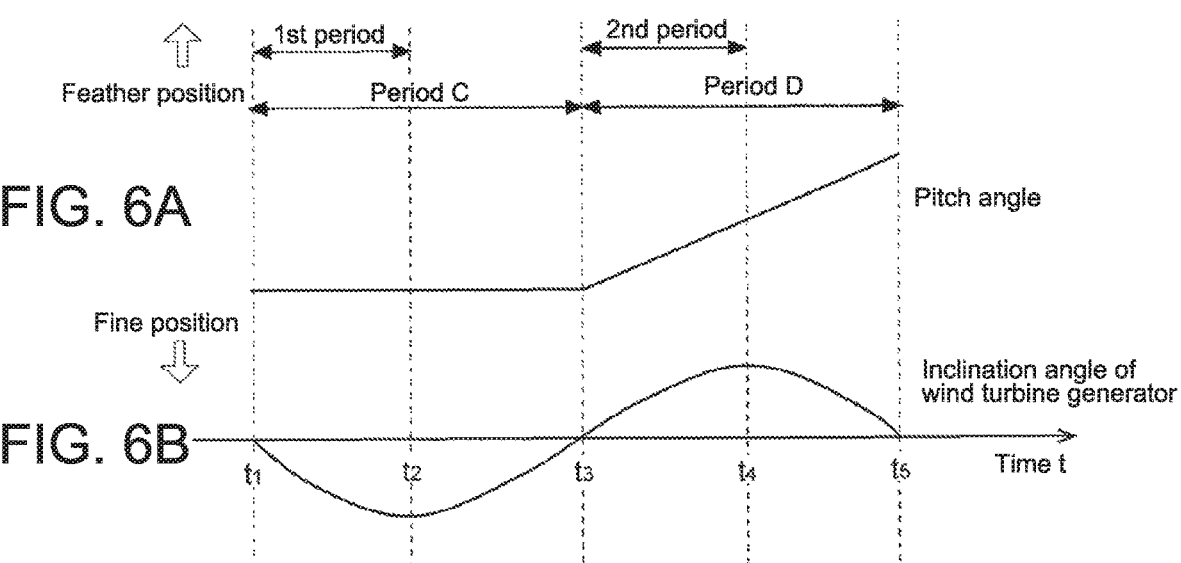
FIGS. 6A to 6C are diagrams for describing a pitch control upon stoppage of a wind turbine generator according to another embodiment of the present embodiment, illustrating a temporal change of the pitch angle, a temporal change of the inclination angle change rate of the wind turbine generator, and a motion of the wind turbine generator, respectively.
Figure 6B:
Figure 6C:
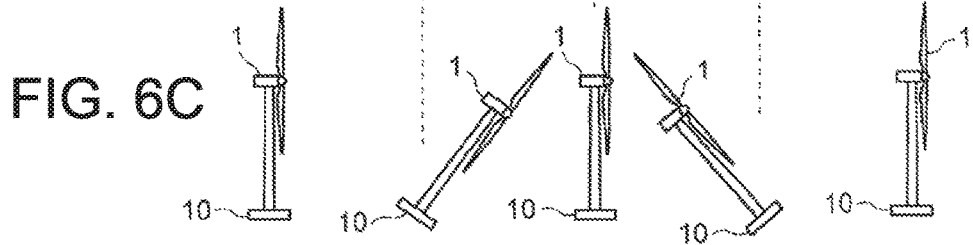
Figure 7A:
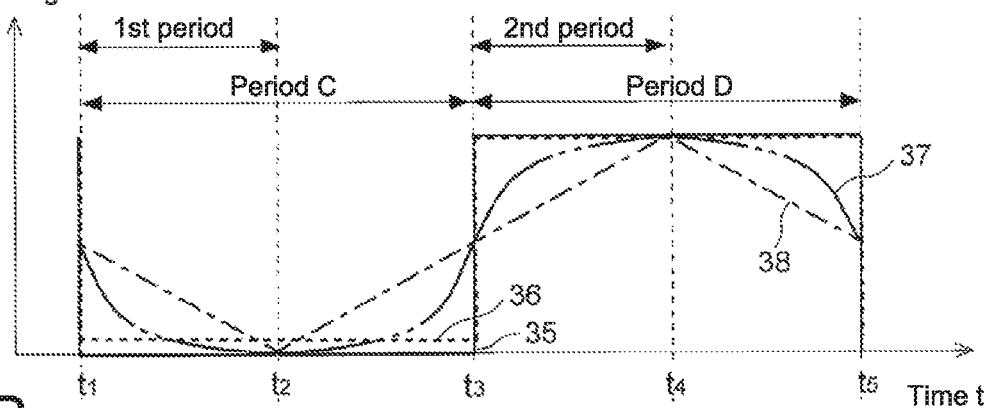
FIGS. 7A to 7C are diagrams for describing a pitch control upon stoppage of a wind turbine generator according to another embodiment of the present embodiment, illustrating a pitch angle change rate of the wind turbine generator, a motion of the wind turbine generator, and a variation example of a pitch angle change rate of the wind turbine generator, respectively.
Figure 7B:
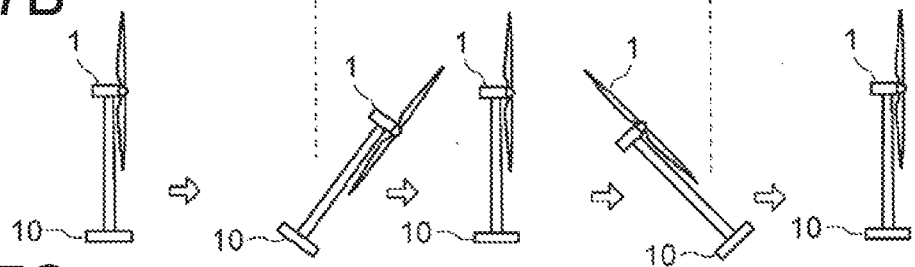
Figure 7C:
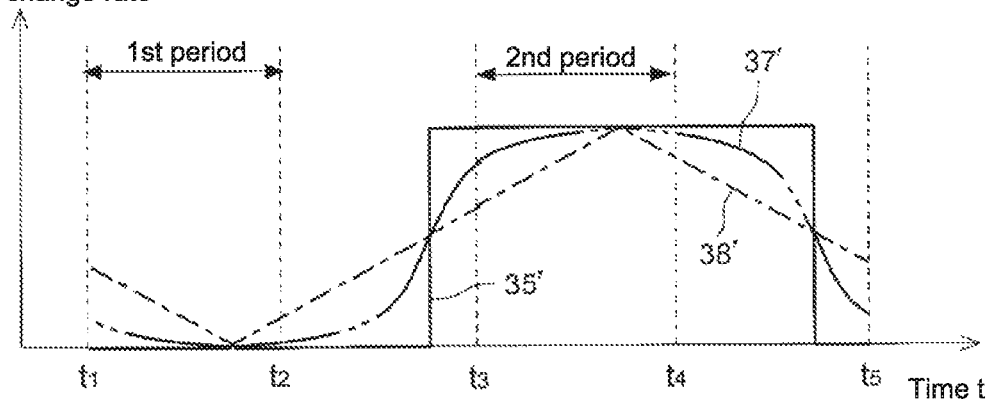
Figure 8:
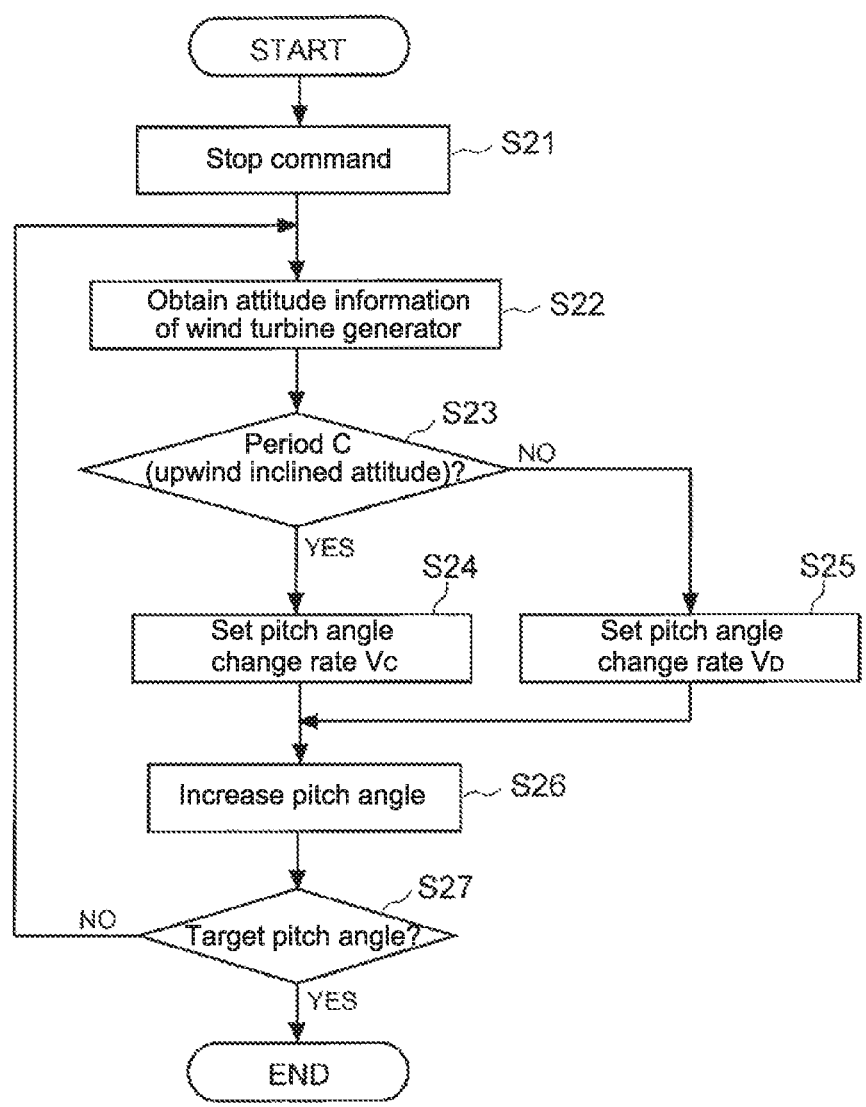
FIG. 8 is a flowchart for describing a pitch control upon stoppage of a wind turbine generator according to another embodiment of the present embodiment.

FIGS. 6A to 6C are diagrams for describing a pitch control upon stoppage of a wind turbine generator according to another embodiment of the present embodiment, illustrating a temporal change of the pitch angle, a temporal change of an inclination angle of the wind turbine generator, and a motion of the wind turbine generator, respectively. FIGS. 7A to 7C are diagrams for describing a pitch control upon stoppage of a wind turbine generator according to another embodiment of the present embodiment, illustrating a pitch angle change rate curve of the wind turbine generator, a motion of the wind turbine generator, and a variation example of a pitch angle change rate of the wind turbine generator, respectively. FIG. 8 is a flowchart for describing a pitch control upon stoppage of a wind turbine generator according to another embodiment of the present embodiment. Here, the time ($t_1$ to $t_5$) and the first and second periods illustrated in FIGS. 6A to 7C correspond to those in the above described FIGS. 3A to 4B, As illustrated in FIG. 6B, the inclination angle of the wind turbine generator 1 caused by sway of the floating body 10 transitions as described below. That is, the inclination angle of the wind turbine generator 1 becomes zero at time $t_1$, when the wind turbine generator 1 is in an inclining motion from the downwind side toward the upwind side and in the vertical attitude, and reaches its minimum at time $t_2$, when the wind turbine generator 1 is in the foremost inclined attitude. Further, the inclination angle becomes zero at time $t_3$, when the wind turbine generator 1 is in an inclining motion from the upwind side toward the downwind side and in the vertical attitude, and reaches its maximum at time $t_4$, when the wind turbine generator 1 is in the rearmost inclined attitude.

In FIG. 6B, the inclination angle toward the upwind side of the wind turbine generator 1 is indicated as negative, and the inclination toward the downwind side as positive.

In one embodiment, the pitch control pant 22 calculates a command value of the pitch angle change rate (pitch rate) of the blade 2 and provides the command value to the pitch adjustment mechanism 21 until the pitch angle of the blade 2 reaches a target pitch angle (e.g. maximum angle), when the pitch angle of the blade 2 is increased. FIG. 7A illustrates pitch angle change rate curves, each of which is time-series data of a command value given to the pitch adjustment mechanism 21. In the drawing, four patterns of pitch angle change rate curves 35 to 38 are illustrated. The pitch angle change rate curve 35 indicated by a solid line corresponds to the pitch angle of FIG. 6A.

In one embodiment, as illustrated in FIGS. 6A and 7A, the pitch control part 22 may control the pitch adjustment mechanism 21 to increase the pitch angle of the blade 2 so that the change rate of the pitch angle of the blade 2 in the total period during which the wind turbine generator 1 is in an inclined attitude toward the upwind side is smaller than the change rate of the pitch angle of the blade 2 in the total period during which the wind turbine generator 1 is in an inclined attitude toward the downwind side. That is, the pitch angle change rate is set to zero in the period C from time $t_1$ to time $t_3$ in accordance with the pitch angle change rate curve 35 so as to keep the pitch angle constant, and the pitch angle change rate is set to a value greater than zero in the period D from time $t_3$ to time k in accordance with the pitch angle change rate curve 35, so as to increase the pitch angle at a constant rate.

In the floating-body wind turbine power generating apparatus 100, it is desirable to maintain the attitude of the wind turbine generator 1 to be as vertical as possible. In this regard, when the wind turbine generator is stopped by the pitch control, it is possible to promote a motion of the wind turbine generator 1 for returning to the vertical attitude, if the attitude of the wind turbine generator 1 is taken into account and the change rate (increasing speed) of the pitch angle is reduced in the total period during which the wind turbine generator 1 is in an inclined attitude toward the upwind side as compared to that in the total period during which the wind turbine generator 1 is in an inclined attitude toward the downwind side. That is, it is possible to restrict a decrease in the aerodynamic thrust force that promotes the motion of the wind turbine generator 1 for returning to the vertical attitude in the total period during which the wind turbine generator 1 is in the inclined attitude toward the upwind side, as well as to promote a decrease in the aerodynamic thrust force that interrupts the motion of the wind turbine generator 1 for returning to the vertical attitude in the total period during which the wind turbine generator 1 is in the inclined attitude toward the downwind side.

Further, in an example of the above embodiment, the pitch angle change rate in the period C is set to zero to maintain the pitch angle to be constant, and the pitch angle change rate in the period D is set to a value larger than zero to increase the pitch angle at a constant rate. However, as indicated by the pitch angle change rate curve 36 in FIG. 7A, the pitch angle change rate in the period C may be larger than zero and smaller than the pitch angle change rate in the period D. Alternatively, as indicated by the pitch angle change rate curves 37, 38, at least one of the pitch angle change rates in the period C or the period D may be varied with time.

Further, as illustrated in FIG. 7A, upon transition from the first period to the second period, the pitch angle change rate may be monotonically increased from the first change rate to the second change rate. Also, upon transition from the second period to the first period, the pitch angle change rate may be monotonically decreased from the second change rate to the first change rate.

In this case, specifically, the pitch angle change rate may be increased or decreased in a stepped pattern as indicated by the above pitch angle change rate curves 35, 36. Alternatively, the pitch angle change rate may be increased or decreased gradually between the first period and the second period as indicated by the pitch angle change rate curves 37, 38.

In a case where the pitch angle change rate is increased or decreased in a stepped pattern, the pitch angle change rate may be decreased in a stepped pattern at time when the wind turbine generator 1 is in the vertical attitude immediately before inclining forward (to the upwind side), and the pitch angle change rate may be increased in a stepper pattern at time $t_3$, when the wind turbine generator 1 has inclined to the front to return to the vertical attitude, in accordance with the pitch angle change rate curves 35, 36.

In a case where the pitch angle change rate is gradually increased or decreased, as indicated by the pitch angle change rate curve 37, the pitch angle change rate may be increased linearly from time when the wind turbine generator 1 is in the foremost inclined attitude to time $t_4$, when the wind turbine generator 1 has inclined to the rear (downwind side) to take the rearmost inclined attitude, and may be decreased linearly from time $t_4$ to the time when the wind turbine generator 1 has inclined to the front to take the foremost inclined attitude.

Alternatively, as indicated by the pitch angle change rate curve 38, the pitch angle change rate may be increased in a curve from time $t_2$, when the wind turbine generator 1 is in the foremost inclined attitude to time $t_4$, when the wind turbine generator 1 has inclined to the rear (downwind side) to take the rearmost inclined attitude, and may be decreased in a curve from time $t_4$ to the time when the wind turbine generator 1 has inclined to the front (upwind side) to take the foremost inclined attitude.

Further, as illustrated in the variation of FIG. 7C, the pitch control of the blade 2 may be performed in accordance with the pitch angle change rate curves 35', 37', 38', which are offset from the pitch angle change rate curves 35, 37, 38 in FIG. 7A toward the upstream side with respect to time. At this time, the amount by which each of the pitch angle change rate curves 35, 37, 38 is offset is not particularly limited as long as it is within a range where the pitch angle change rate in the first period is smaller than the pitch angle change rate in the second period.

Next, with reference to FIG. 8, the pitch control upon stoppage of the wind turbine generator 1 will be described. Here, described below is a case where the pitch of the blade 2 is controlled so that the pitch angle change rate of the blade 2 in the period C is smaller than the pitch angle change rate of the blade 2 in the period D, as illustrated in FIGS. 6A to 7C.

As illustrated in FIG. 8, once a stop command is given to the pitch control part 22 of the wind turbine generator 1 (S21), attitude information of the wind turbine generator 1 is obtained (S22). Here, the attitude information may be an inclination angle of the wind turbine generator 1. Further, the inclination angle may be obtained from various sensors such as the acceleration sensor 25 and the attitude detection sensor.

Next, on the basis of the attitude information, it is determined whether a period corresponding to the current motion of the wind turbine generator 1 matches the period C in which the wind turbine generator 1 is in the inclined attitude toward the upwind side (S23). If the period corresponding to the current attitude of the wind turbine generator 1 is the period C, the pitch angle change rate $V_C$ is set (S24). If the period corresponding to the current motion of the wind turbine generator 1 is not the period C, the period is determined to be the period D, and the pitch angle change rate $V_D$ is set (S25). At this time, the pitch angle change rate $V_C$ is smaller than the pitch angle change rate $V_D$. Then, the pitch angle change rate $V_C$ or the pitch angle change rate $V_D$ having been set is inputted to the pitch adjustment mechanism 21 as a command value, and the pitch adjustment mechanism 21 increases the pitch angle of the blade 2 (S26). A target pitch angle (e.g. the maximum angle) is set for the pitch control part 22 in advance, and the pitch control part 22 determines whether the pitch angle of the blade 2 has reached the target pitch angle (S27). If the target pitch angle is reached, the pitch control is completed.

As described above, according to the above embodiment, when the wind turbine generator 1 is stopped, it is possible to restrict a decrease in the aerodynamic thrust force of the first period, which functions advantageously in restriction of the sway of the floating body, as well as to promote a decrease in the aerodynamic thrust force of the second period, which functions disadvantageously in restriction of the sway of the floating body. Thus, it is possible to stop the wind turbine generator 1 while restricting sway of the floating body.

(Pitch Control Upon Start of a Wind Turbine Generator)

Figure 10A:
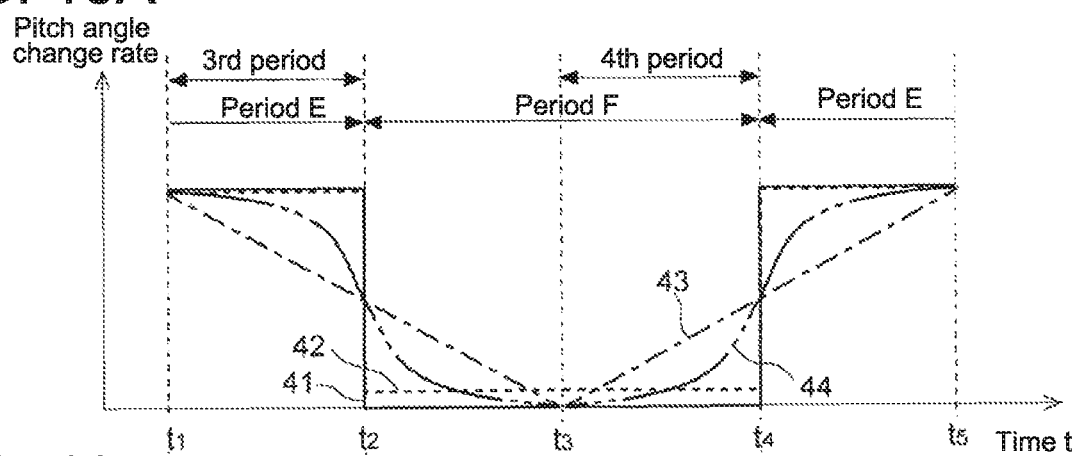
FIGS. 10A and 10B are diagrams for describing a pitch control upon start of a wind turbine generator according to an embodiment of the present embodiment, illustrating a pitch angle change rate of the wind turbine generator and a motion of the wind turbine generator, respectively.
Figure 10B:
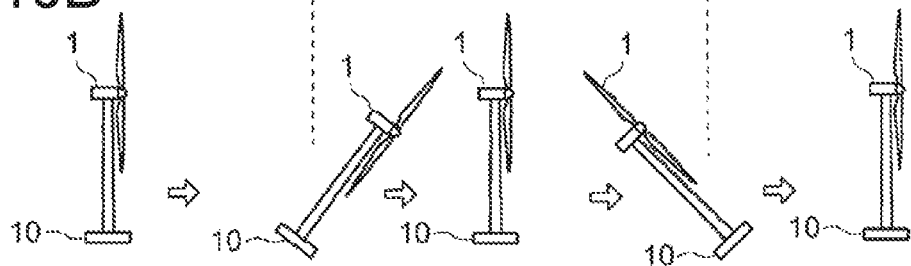
Figure 11:
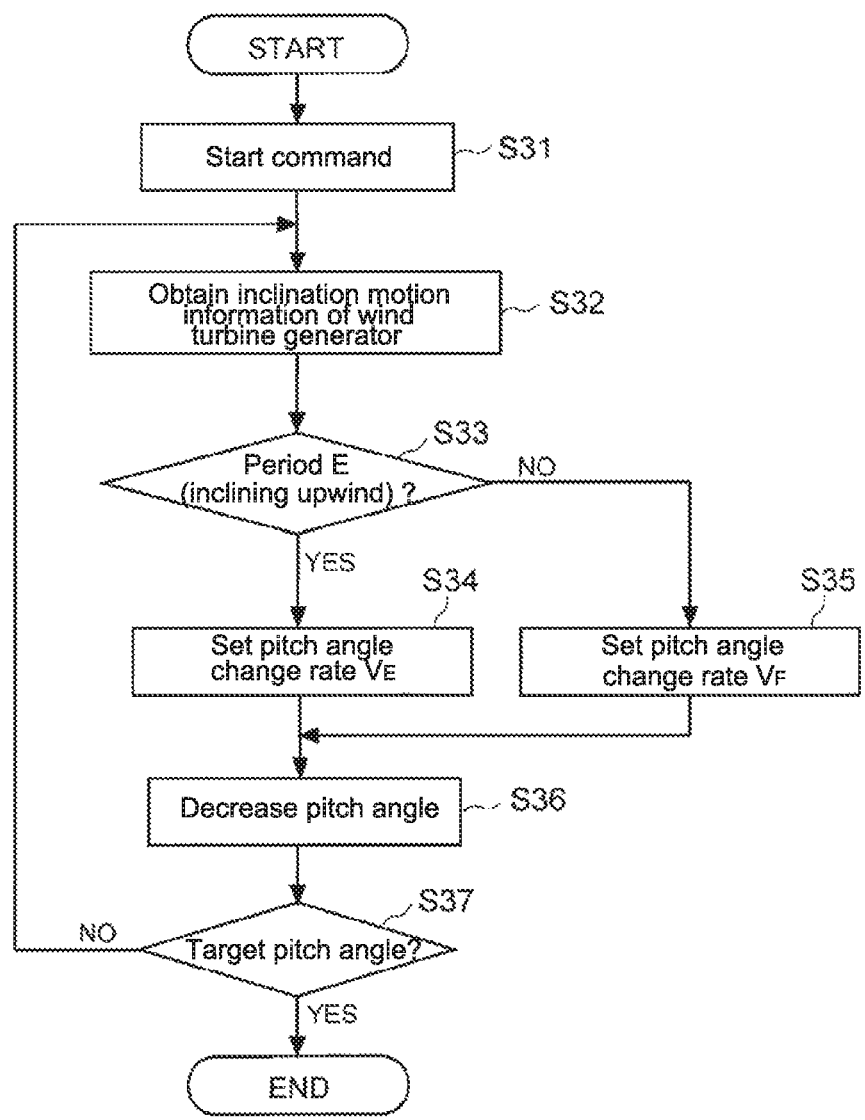
FIG. 11 is a flowchart for describing a pitch control upon start of a wind turbine generator according to an embodiment of the present embodiment.

FIGS. 9A to 9C are diagrams for describing a pitch control upon start of a wind turbine generator according to an embodiment of the present embodiment, illustrating a temporal change of the pitch angle, a temporal change of the inclination angle change rate of the wind turbine generator, and a motion of the wind turbine generator, respectively. FIGS. 10A and 10B are diagrams for describing a pitch control upon start of a wind turbine generator according to an embodiment of the present embodiment, illustrating a pitch angle change rate of the wind turbine generator and a motion of the wind turbine generator, respectively. FIG. 11 is a flowchart for describing a pitch control upon start of a wind turbine generator 1 according to an embodiment of the present embodiment.

FIG. 9A illustrates a temporal change of the pitch angle of the blade 2 of the wind turbine generator 1. Once a start command is inputted to the pitch control part 22, the pitch control part 22 controls the pitch adjustment mechanism 21 to decrease the pitch angle of the blade 2, so that a lift applied to the blade 2 increases. That is, since the pitch angle is set at the feather position side during shutdown so that a lift is not applied to the blade 2, the pitch angle is shifted from the feather position side to the fine position side when the blade 2 is started.

In one embodiment, the pitch control part 22 calculates a command value of the pitch angle change rate (pitch rate) of the blade 2 and provides the command value to the pitch adjustment mechanism 21 until the pitch angle of the blade 2 reaches a target pitch angle (e.g. zero degree), when the pitch angle of the blade 2 is decreased. FIG. 10A illustrates pitch angle change rate curves, each of which is time-series data of a command value given to the pitch adjustment mechanism 21. In the drawing, four types of pitch angle change rate curves 41 to 44 are illustrated. The pitch angle change rate curve 41 indicated by a solid line corresponds to the pitch angle of FIG. 9A.

Here, in the third period, during which the wind turbine generator 1 is in an inclining motion toward the upwind side from the vertical direction, the thrust force received by the rotor 4 from wind is a factor that reduces the acceleration of the wind turbine generator 1 toward the upwind side, and functions advantageously in restriction of sway of the floating body 10. Thus, when the wind turbine generator 1 is started by decreasing the pitch angle of the blade 2 and increasing a lift applied to the blade 2, a rapid decrease in the pitch angle of the blade 2 during the third period means an increase in the factor for reducing the acceleration of the wind turbine generator 1 toward the upwind side, which may possibly contribute to restriction of the sway of the floating body 10. On the other hand, in the fourth period, during which the wind turbine generator 1 is in an inclining motion toward the downwind side from the vertical direction, the thrust force received by the rotor 4 from wind is a factor that increases the acceleration of the wind turbine generator 1 toward the downwind side, and functions disadvantageously in restriction of sway of the floating body 10. Thus, when the wind turbine generator 1 is started by decreasing the pitch angle of the blade 2 and increasing a lift applied to the blade 2, a rapid decrease in the pitch angle of the blade 2 during the fourth period means an increase in the factor for increasing the acceleration of the wind turbine generator 1 toward the downwind side, which may amplify the sway of the floating body 10.

Accordingly, in some embodiments, the following pitch control is performed in view of the above relationship between sway of the floating body 10 and the aerodynamic thrust force received by the rotor 4.

Specifically, the pitch control part 22 decreases the pitch angle of the blade 2 so that the third change rate (decreasing speed) of the pitch angle of the blade 2 in the third period, during which the wind turbine generator 1 is in an inclining motion toward the upwind side from the vertical direction, is larger than the fourth change rate (decreasing speed) of the pitch angle of the blade 2 in the fourth period, during which the wind turbine generator 1 is in an inclining motion toward the downwind side from the vertical direction. In the example illustrated in FIGS. 9A and 10A, the pitch angle is changed in accordance with the pitch angle change rate curve 41. That is, the pitch angle change rate is set to a value larger than zero in the third period from time $t_1$ to time $t_2$ so as to increase the pitch angle at a constant rate, and the pitch angle change rate is set to zero in the fourth period from time $t_3$ to time $t_4$ so as to keep the pitch angle constant.

As described above, with the third change rate (decreasing speed) of the pitch angle in the third period being larger than the fourth change rate (decreasing speed) of the pitch angle in the fourth period, it is possible to promote an increase in the aerodynamic thrust force of the third period, which functions advantageously in restriction of the sway of the floating body, as well as to restrict an increase in the aerodynamic thrust force of the fourth period, which functions disadvantageously in restriction of the sway of the floating body. Thus, it is possible to start, the wind turbine generator while restricting sway of the floating body.

In one embodiment, as illustrated in FIGS. 9A and 10A, the pitch control part 22 may control the pitch adjustment mechanism 21 to decrease the pitch angle of the blade 2 so that the change rate of the pitch angle of the blade 2 in the total period (period E) during which the wind turbine generator 1 is in an inclining motion toward the upwind side, is larger than the change rate of the pitch angle of the blade 2 in the total period (period F) during which the wind turbine generator 1 is in an inclining motion toward the downwind side. In the example illustrated in FIGS. 9A and 10A, the pitch angle is changed in accordance with the pitch angle change rate curve 41. That is, the pitch angle change rate is set to a value greater than zero in the period E from time $t_1$ to time $t_2$ and time $t_4$ to $t_5$, and the pitch angle change rate is set to zero in the period F from time $t_2$ to time $t_4$.

In the total period (period E) during which the wind turbine generator 1 is in an inclining motion toward the upwind side, the thrust force received by the rotor 4 from wind contributes to restriction of the inclining motion of the wind turbine generator 1 toward the upwind side associated with the sway of the floating body 10. On the other hand, in the total period (period F) during which the wind turbine generator 1 is in an inclining motion toward the downwind side, the thrust force received by the rotor 4 from wind promotes the inclining motion of the wind turbine generator 1 toward the downwind side associated with the sway of the floating body 10. In view of this, when the wind turbine generator 1 is started by the pitch control, if the direction of the inclining motion of the wind turbine generator 1 is taken into account and the change rate (decreasing speed) of the pitch angle is increased in the total period (period E) during which the wind turbine generator 1 is in an inclining motion toward the upwind side as compared to that in the total period (period F) during which the wind turbine generator 1 is in an inclining motion toward the downwind side, it is possible to start the wind turbine generator 1 while effectively restricting sway of the floating body. In other words, it is possible to promote an increase in the aerodynamic thrust force, which functions advantageously in restriction of the inclining motion (the sway of the floating body) in the total period (period E) during which the wind turbine generator 1 is in an inclining motion toward the upwind side, as well as to restrict an increase in the aerodynamic thrust force, which functions disadvantageously in restriction of the inclining motion (the sway of the floating body) in the total period (period F) during which the wind turbine generator 1 is in an inclining motion toward the downwind side.

In some embodiments, at time $t_2$, when the wind turbine generator 1 is inclined to the foremost attitude, and at time $t_4$, when the wind turbine generator 1 is inclined to the rearmost attitude, the pitch angle change rate is varied in a stepped pattern between the pitch angle change rate $V_E$ of the period E and the pitch angle change rate $V_E$ ($<V_E$) of the period F.

In one embodiment, in accordance with the pitch angle change rate curve 41 illustrated in FIG. 10A, the pitch angle change rate is varied in a stepped pattern between the pitch angle change rate $V_E$ ($>0$) of the period E and the pitch angle change rate $V_E$ ($=0$) of the period F. In another embodiment, in accordance with the pitch angle change rate curve 42 in FIG. 10A, the pitch angle change rate is varied in a stepped pattern between the pitch angle change rate $V_E$ of the period E and the pitch angle change rate $V_E$ ($<V_E$) of the period F, which is greater than zero.

In yet another embodiment, in accordance with the pitch angle change rate curves 43, 44 in FIG. 4A, at least one of the pitch angle change rate $V_E$ of the period E including the third period or the pitch angle change rate $V_F$ of the period F including the fourth period may be set on the basis of an optional function F(t). That is, the pitch angle change rate $V_E$ or the pitch angle change rate $V_F$ may be varied continuously with time.

In some embodiments, upon transition from the third period to the fourth period, the pitch angle change rate is monotonically decreased from the third change rate to the fourth change rate. Also, upon transition from the fourth period to the third period, the pitch angle change rate is monotonically increased from the fourth change rate to the third change rate.

As described above, upon transition from the third period to the fourth period, the pitch angle change rate is monotonically decreased from the third change rate to the fourth change rate. Also, upon transition from the fourth period to the third period, the pitch angle change rate is monotonically increased from the fourth change rate to the third change rate, which makes it possible to smoothly start the wind turbine generator 1 by the pitch control.

In this case, specifically, the pitch angle change rate may be increased or decreased in a stepped pattern as indicated by above the pitch angle change rate curves 41, 42. Alternatively, the pitch angle change rate may be increased or decreased gradually between the third period and the fourth period as indicated by the pitch angle change rate curves 43, 44.

In a case where the pitch angle change rate is increased or decreased in a stepped pattern, the pitch angle change rate may be decreased in a stepped pattern at time $t_2$, when the wind turbine generator 1 is in the foremost inclined attitude, and the pitch angle change rate may be increased in a stepped pattern at time $t_4$, when the wind turbine generator 1 is in the rearmost inclined attitude, in accordance with the pitch angle change rate curves 41, 42. It is desirable to promote an increase in the thrust force so as to restrict the inclining motion of the wind turbine generator 1 to the front (upwind side) immediately before time $t_2$, when the wind turbine generator 1 is in the foremost inclined attitude, and to restrict an increase in the thrust force against the rotor 4 so as to reduce the inclining motion toward the rear (downwind side) of the wind turbine generator 1 immediately after time $t_2$. On the other hand, it is desirable to restrict an increase in the thrust force so as to reduce the inclining motion toward the rear (downwind side) of the wind turbine generator 1 immediately before time $t_4$, when the wind turbine generator 1 is in the rearmost inclined attitude, and to promote an increase in the thrust force against the rotor 4 so as to restrict the inclining motion of the wind turbine generator 1 to the front (upwind side) immediately after time $t_4$. That is, for time $t_2$, when the wind turbine generator 1 is in the foremost inclined attitude and at time $t_4$, when the wind turbine generator 1 is in the rearmost inclined attitude, demands for the thrust force before and after the time are totally opposite to each other. Thus, changing the pitch angle change rate at time $t_2$ and time $t_4$ in a stepped pattern makes it possible to smoothly start the wind turbine generator 1 while restricting sway of the floating body 10 more effectively.

In a case where the pitch angle change rate is gradually increased or decreased, as indicated by the pitch angle change rate curve 43, the pitch angle change rate may be decreased linearly from time $t_1$, when the wind turbine generator 1 is in the vertical attitude to time $t_3$, when the wind turbine generator 1 has inclined toward the front (upwind side) to return to the vertical attitude, and the pitch angle change rate may be increased linearly from time $t_3$ to time $t_5$, when the wind turbine generator 1 has inclined to the rear (downwind side) to return to the vertical attitude. Alternatively, as indicated by the pitch angle change rate curve 44, the pitch angle change rate may be decreased in a curve from time $t_1$, when the wind turbine generator 1 is in the vertical attitude to time $t_3$, when the wind turbine generator 1 has inclined toward the front (upwind side) to return to the vertical attitude, and may be increased in a curve from time $t_3$ to time $t_5$, when the wind turbine generator 1 has inclined to the rear (downwind side) to return to the vertical attitude.

Now, with reference to FIG. 11, the pitch control upon start of the wind turbine generator 1 will be described. Here, described below is a case where the pitch control of the blade 2 is performed so that the pitch angle change rate of the blade 2 in the period E is larger than the pitch angle change rate of the blade 2 in the period F, as illustrated in FIGS. 9A to 10B.

As illustrated in FIG. 11, if a start command is given to the pitch control part 22 of the wind turbine generator 1 (S31), inclining motion information of the wind turbine generator 1 is obtained (S32). Here, the inclining motion information may be an inclination angle change rate or an inclining direction of the wind turbine generator 1. Further, the inclination angle change rate or the inclining direction may be obtained from various sensors such as the acceleration sensor 25 and the attitude detection sensor.

Next, on the basis of the inclination motion information, it is determined whether a period corresponding to the current motion of the wind turbine generator 1 matches the period E in which the wind turbine generator 1 is inclining toward the upwind side (S33). If the period corresponding to the current motion of the wind turbine generator 1 is the period E, the pitch angle change rate $V_E$ is set (S34). If the period corresponding to the current motion of the wind turbine generator 1 is not the period E, the period is determined to be the period F, and the pitch angle change rate $V_F$ is set (S35). At this time, the pitch angle change rate $V_E$ is smaller than the pitch angle change rate $V_F$. Then, the pitch angle change rate $V_E$ or the pitch angle change rate $V_F$ having been set is inputted to the pitch adjustment mechanism 21 as a command value, and the pitch adjustment mechanism 21 decreases the pitch angle of the blade 2 (S36). A target pitch angle (e.g. zero degree) is set for the pitch control part 22 in advance, and the pitch control part 22 determines whether the pitch angle of the blade 2 has reached the target pitch angle (S37). If the target pitch angle is reached, the pitch control is completed.

Next, with reference to FIGS. 12A to 14, the pitch control upon start of the wind turbine generator according to another embodiment will be described.

Figure 13A:
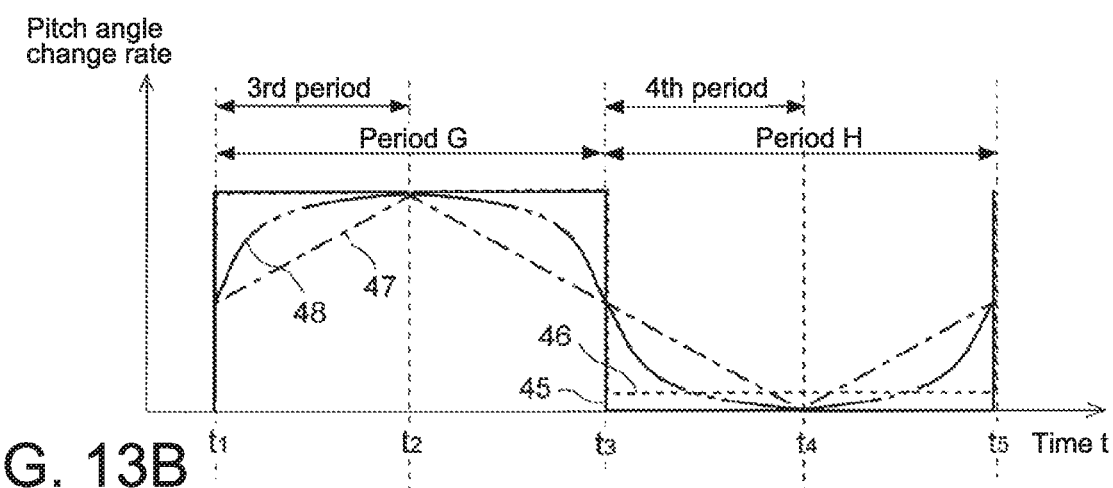
FIGS. 13A and 13B are diagrams for describing a pitch control upon start of a wind turbine generator according to an embodiment of the present embodiment, illustrating a pitch angle change rate of the wind turbine generator and a motion of the wind turbine generator, respectively.
Figure 13B:
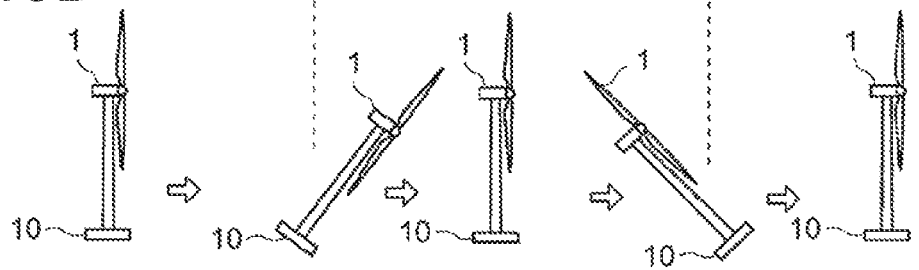
Figure 14:
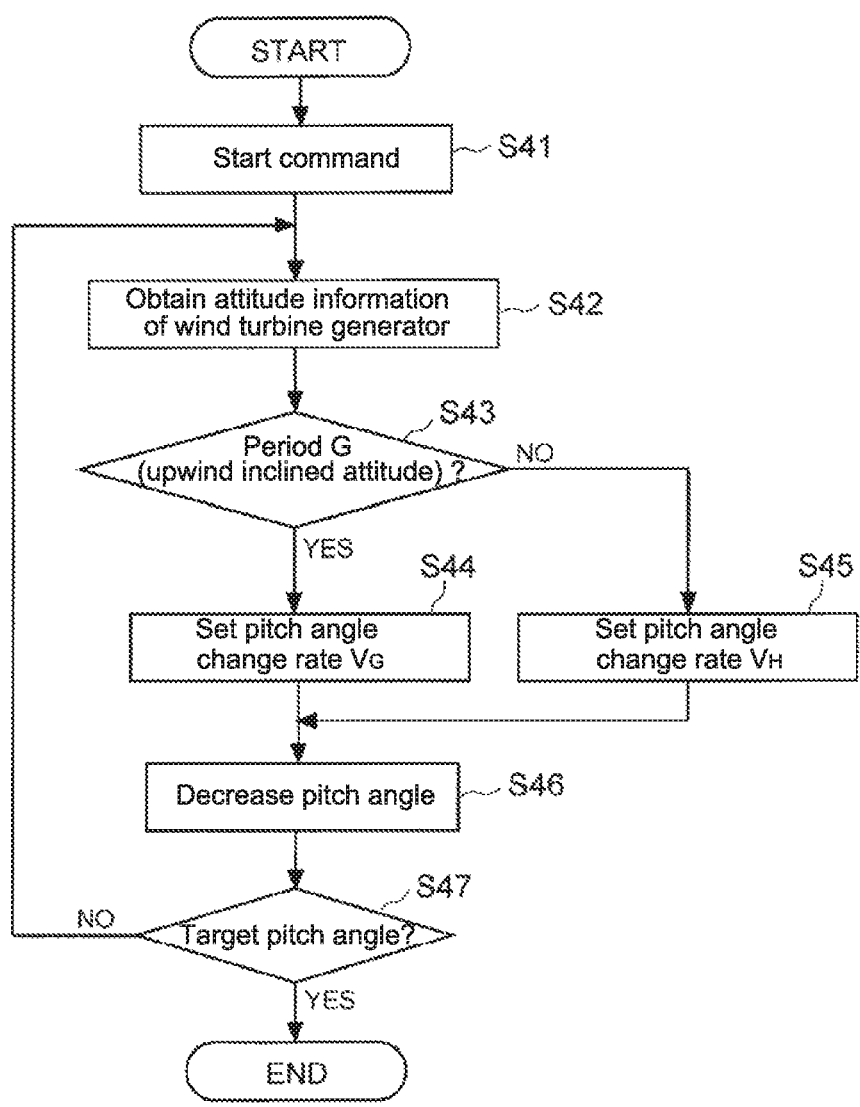
FIG. 14 is a flowchart for describing a pitch control upon start of a wind turbine generator according to another embodiment of the present embodiment.

FIGS. 12A to 12C are diagrams for describing a pitch control upon start of a wind turbine generator according to another embodiment of the present embodiment, illustrating a temporal change of the pitch angle, a temporal change of an inclination angle of the wind turbine generator, and a motion of the wind turbine generator, respectively. FIGS. 13A and 13B are diagrams for describing a pitch control upon start of a wind turbine generator according to an embodiment of the present embodiment, illustrating a pitch angle change rate of the wind turbine generator and a motion of the wind turbine generator, respectively. FIG. 14 is a flowchart for describing a pitch control upon start of a wind turbine generator according to another embodiment of the present embodiment. Here, the time ($t_1$ to $t_5$) and the third and fourth periods illustrated in FIGS. 12A to 13B correspond to those in the above described FIGS. 9A to 10B.

In one embodiment, the pitch control part 22 calculates a command value of the pitch angle change rate (pitch rate) of the blade 2 and provides the command value to the pitch adjustment mechanism 21 until the pitch angle of the blade 2 reaches a target pitch angle (e.g. zero degree), when the pitch angle of the blade 2 is decreased. FIG. 13A illustrates pitch angle change rate curves, each of which is time-series data of a command value given to the pitch adjustment mechanism 21. In the drawing, four patterns of pitch angle change rate curves 45 to 48 are illustrated. The pitch angle change rate curve 45 indicated by a solid line corresponds to the pitch angle of FIG. 12A.

In one embodiment, as illustrated in FIGS. 12A and 13A, the pitch control part 22 may control the pitch adjustment mechanism 21 to decrease the pitch angle of the blade 2 so that the change rate of the pitch angle of the blade 2 in the total period during which the wind turbine generator 1 is in an inclined attitude toward the upwind side is larger than the change rate of the pitch angle of the blade 2 in the total period during which the wind turbine generator 1 is in an inclined attitude toward the downwind side. That is, the pitch angle change rate is set to a value larger than zero in the period G from time $t_1$ to time $t_3$ so as to decrease the pitch angle at a constant rate in accordance with the pitch angle change rate curve 45, and the pitch angle change rate is set to zero in the period H from time $t_3$ to time $t_5$ in accordance with the pitch angle change rate curve 45, so as to maintain the pitch angle constant.

In the floating-body wind turbine power generating apparatus 100, it is desirable to maintain the attitude of the wind turbine generator 1 to be as vertical as possible. In this regard, when the wind turbine generator 1 is started by the pitch control, it is possible to promote a motion of the wind turbine generator 1 for returning to the vertical attitude, if the attitude of the wind turbine generator 1 is taken into account and the change rate (decreasing speed) of the pitch angle is increased in the total period during which the wind turbine generator 1 is in an inclined attitude toward the upwind side as compared to that in the total period during which the wind turbine generator 1 is in an inclined attitude toward the downwind side. That is, it is possible to promote an increase in the aerodynamic thrust force that promotes the motion of the wind turbine generator 1 for returning to the vertical attitude in the total period during which the wind turbine generator 1 is in the inclined attitude toward the upwind side, as well as to restrict an increase in the aerodynamic thrust force that interrupts the motion of the wind turbine generator 1 for returning to the vertical attitude in the total period during which the wind turbine generator 1 is in the inclined attitude toward the downwind side.

Further, in an example of the above embodiment, the pitch angle change rate in the period G is set to a value larger than zero to decrease the pitch angle at a constant rate, and the pitch angle change rate in the period H is set to zero to maintain the pitch angle to be constant. However, as indicated by the pitch angle change rate curve 46 in FIG. 13A, the pitch angle change rate in the period H may be larger than zero and smaller than the pitch angle change rate in the period G. Further, as indicated by the pitch angle change rate curves 47, 48, at least one of the pitch angle change rates in the period C or the period D may be varied with time.

Further, as illustrated in FIG. 13A, upon transition from the third period to the fourth period, the pitch angle change rate may be monotonically decreased from the third change rate to the fourth change rate. Also, upon transition from the fourth period to the third period, the pitch angle change rate may be monotonically increased from the fourth change rate to the third change rate.

In this case, specifically, the pitch angle change rate may be increased or decreased in a stepped pattern as indicated by the above pitch angle change rate curves 45, 46 or the pitch angle change rate may be increased or decreased gradually between the third period and the fourth period as indicated by the pitch angle change rate curves 47, 48.

In a case where the pitch angle change rate is increased or decreased in a stepped pattern, the pitch angle change rate may be increased in a stepped pattern at time $t_1$, when the wind turbine generator 1 is in the vertical attitude immediately before inclining forward (to the upwind side), and the pitch angle change rate may be decreased in a stepper pattern at time $t_3$, when the wind turbine generator 1 has inclined toward the front to return to the vertical attitude, in accordance with the pitch angle change rate curves 45, 46.

In a case where the pitch angle change rate is gradually increased or decreased, as indicated by the pitch angle change rate curve 47, the pitch angle change rate may be decreased linearly from time $t_2$ when the wind turbine generator 1 is in the foremost inclined attitude, to time $t_4$, when the wind turbine generator 1 has inclined toward the rear (downwind side) to take the rearmost inclined attitude, and the pitch angle change rate may be increased linearly from time $t_4$ to the time when the wind turbine generator 1 has inclined toward the front to take the foremost inclined attitude.

Alternatively, as indicated by the pitch angle change rate curve 48, the pitch angle change rate may be decreased in a curve from time $t_2$, when the wind turbine generator 1 is in the foremost inclined attitude, to time $t_4$, when the wind turbine generator 1 has inclined to the rear (downwind side) to take the rearmost inclined attitude, and may be increased in a curve from time $t_4$ to the time when the wind turbine generator 1 has inclined to the front to take the foremost inclined attitude.

Further, the pitch control of the blade 2 may be performed in accordance with pitch angle change rate curves offset from the pitch angle change rate curves 45, 46, 47, 48 in FIG. 13A toward the upstream side with respect to time. At this time, the amount by which each of the pitch angle change rate curves 45, 46, 47, 48 is offset is not particularly limited as long as it is within a range where the pitch angle change rate in the third period is larger than the pitch angle change rate in the fourth period.

Next, with reference to FIG. 14, the pitch control upon start of the wind turbine generator 1 will be described. Here, described below is a case where the pitch of the blade 2 is controlled so that the pitch angle change rate of the blade 2 in the period G is larger than the pitch angle change rate of the blade 2 in the period H, as illustrated in FIGS. 12A and 13B.

As illustrated in FIG. 14, once a start command is given to the pitch control part 22 of the wind turbine generator 1 (S41), attitude information of the wind turbine generator 1 is obtained (S42). Here, the attitude information may be an inclination angle of the wind turbine generator 1. Further, the inclination angle may be obtained from various sensors such as the acceleration sensor 25 and the attitude detection sensor.

Next, on the basis of the attitude information, it is determined whether a period corresponding to the current motion of the wind turbine generator 1 matches the period Gin which the wind turbine generator 1 is in the inclined attitude toward the upwind side (S43). If the period corresponding to the current attitude of the wind turbine generator 1 is the period G, the pitch angle change rate $V_G$ is set (S44). If the period corresponding to the current motion of the wind turbine generator 1 is not the period G, the period is determined to be the period H, and the pitch angle change rate $V_H$ is set (S45). At this time, the pitch angle change rate $V_G$ is larger than the pitch angle change rate $V_H$. Then, the pitch angle change rate $V_G$ or the pitch angle change rate $V_R$ having been set is inputted to the pitch adjustment mechanism 21 as a command value, and the pitch adjustment mechanism 21 decreases the pitch angle of the blade 2 (S46). A target pitch angle (e.g. zero degree) is set for the pitch control part 22 in advance, and the pitch control part 22 determines whether the pitch angle of the blade 2 has reached the target pitch angle (S47). If the target pitch angle is reached, the pitch control is completed.

As described above, according to the above embodiment, when the wind turbine generator 1 is started, it is possible to promote an increase in the aerodynamic thrust force of the third period, which functions advantageously in restriction of the sway of the floating body, as well as to restrict an increase in the aerodynamic thrust force of the fourth period, which functions disadvantageously in restriction of the sway of the floating body. Thus, it is possible to start the wind turbine generator 1 while restricting sway of the floating body.

Further, in one embodiment, when the wind turbine generator 1 in FIG. 1 is stopped or started, the respective pitch angle change rates may be varied between the plurality of blades 2 until the target pitch angle is achieved, so that a moment acting as a restoration force against the sway of the floating body 10 is obtained. For instance, the pitch angle change rates are varied in accordance with the respective angular positions of the blades in the rotor rotational plane. Specifically, when the wind turbine generator 1 is stopped, while the wind turbine generator 1 is in a motion of inclining to the front (to the upwind side) from the vertical direction, the pitch angle change rate of one of the blades 2 positioned at the upper part of the rotor rotational plane is set to be smaller than the pitch angle change rate of one of the blades 2 positioned at the lower part of the rotor rotational plane. In this way, it is to possible to distribute the thrust force differently over the rotor rotational plane, which makes it possible to apply a moment for returning the wind turbine generator 1 to the vertical attitude from the forward inclined attitude to the wind turbine generator 1. On the other hand, while the wind turbine generator 1 is in a motion of inclining to the rear (to the downwind side) from the vertical direction, the pitch angle change rate of one of the blades 2 positioned at the lower part of the rotor rotational plane is set to be smaller than the pitch angle change rate of one of the blades positioned at the upper part of the rotor rotational plane, which makes it possible to contribute to restriction of the sway of the floating body 10. When the wind turbine generator 1 is started, it is also possible to restrict the sway of the floating body 10 by controlling the respective pitch angle change rates of the plurality of the blades 2 individually in a suitable manner. Here, in a case where the respective pitch angle change rates are varied between the plurality of blades 2, for instance, the respective pitch angle change rates may be varied by differentiating the phases of the blades 2 on the pitch angle change rate curve in FIG. 4, or the respective pitch adjustment mechanism 21 of the blades 2 may be provided with different pitch angle change rate curves.

Further, in another embodiment, when the wind turbine generator 1 is stopped, the yaw control for the wind turbine generator 1 may be used in cooperation with the above pitch control to assist the deceleration of the rotor 4. In this case, the wind turbine generator 1 includes a yaw drive mechanism for rotating the nacelle 5 in the horizontal direction with respect to the tower 6, and a yaw control part for controlling the yaw driving mechanism. When a stop command for the wind turbine generator 1 is inputted, the yaw control part controls the yaw drive mechanism so that the rotor 4 faces the downwind side, at the same time as the pitch control, or before or after the pitch control. In this way, it is possible to stop the wind turbine generator 1 swiftly.

Embodiments of the present invention were described in detail above, but the present invention is not limited thereto, and various amendments and modifications may be implemented within a scope that does not depart from the present invention.

For instance, while a floating-body wind turbine power generating apparatus of an upwind type is illustrated in the above embodiment, the present invention can be applied to a floating-body wind turbine power generating apparatus of a downwind type.

Further, in the described example of the above embodiment, the pitch angle change rate (increasing speed or decreasing speed of the pitch angle) is determined on the basis of the inclination angle or the inclination angle change rate of the wind turbine generator 1 when the wind turbine generator 1 is stopped or started. However, the pitch angle change rate may be determined on the basis of both of the inclination angle and the inclination angle change rate of the wind turbine generator 1. Further, in addition to the index indicating the inclination of the wind turbine generator 1 such as the inclination angle and the inclination angle change rate of the wind turbine generator 1, the pitch angle change rate (increasing speed or decreasing speed of the pitch angle) may be determined using other indexes such as a rotation speed of the rotor 4, a current pitch angle, and an elapsed time after start of the pitch control.

The invention claimed is:

1. A method of controlling a floating-body wind turbine power generating apparatus including a wind turbine generator disposed on a floating body, the method comprising
    a pitch-angle decreasing step of decreasing a pitch angle of a blade of the wind turbine generator when the wind turbine generator is started, so that a lift applied to the blade of the wind turbine generator increases,
    wherein, in the pitch-angle decreasing step, a third change rate of the pitch angle of the blade in a third period during which the wind turbine generator is in an inclining motion toward an upwind side from a vertical direction due to sway of the floating body, is larger than a fourth change rate of the pitch angle of the blade in a fourth period during which the wind turbine generator is in an inclining motion toward a downwind side from the vertical direction due to the sway of the floating body.

2. The method of controlling a floating-body wind turbine power generating apparatus according to claim 1,
    wherein, in the pitch-angle decreasing step, a change rate of the pitch angle of the blade in a total period during which the wind turbine generator is in the inclining motion toward the upwind side, is larger than a change rate of the pitch angle of the blade in a total period during which the wind turbine generator is in the inclining motion toward the downwind side.

3. The method of controlling a floating-body wind turbine power generating apparatus according to claim 1,
wherein, in the pitch-angle decreasing step, a change rate of the pitch angle of the blade in a total period during which the wind turbine generator has an inclined attitude toward the upwind side, is larger than a change rate of the pitch angle of the blade in a total period during which the wind turbine generator has an inclined attitude toward the downwind side.

4. The method of controlling a floating-body wind turbine power generating apparatus according to claim 1,
wherein, in the pitch-angle decreasing step, the change rate of the pitch angle is monotonically decreased from the third change rate to the fourth change rate upon transition from the third period to the fourth period, and the change rate of the pitch angle is monotonically increased from the fourth change rate to the third change rate upon transition from the fourth period to the third period.

5. A floating-body wind turbine power generating apparatus comprising:
a floating body;
a wind turbine generator disposed on the floating body, the wind turbine generator including a rotor in which a blade is mounted to a hub, and a pitch adjustment mechanism for adjusting a pitch angle of the blade; and
a pitch control part for controlling the pitch adjustment mechanism so that a lift applied to the blade is increased by a decrease in the pitch angle when the wind turbine generator is started,
wherein the pitch control part is configured to control a third change rate of the pitch angle of the blade in a third period during which the wind turbine generator is in an inclining motion toward an upwind side from a vertical direction due to sway of the floating body to be larger than a fourth change rate of the pitch angle of the blade in a fourth period during which the wind turbine generator is in an inclining motion toward a downwind side from the vertical direction due to the sway of the floating body.

6. A control device for the floating-body wind turbine power generating apparatus according to claim 5, the control device comprising:
a pitch control part for controlling the pitch adjustment mechanism so that a lift applied to the blade is increased by a decrease in the pitch angle when the wind turbine generator is started,
wherein the pitch control part is configured to control a third change rate of the pitch angle of the blade in a third period during which the wind turbine generator is in an inclining motion toward an upwind side from a vertical direction due to the sway of the floating body to be larger than a fourth change rate of the pitch angle of the blade in a fourth period during which the wind turbine generator is in an inclining motion toward a downwind side from the vertical direction due to the sway of the floating body.

7. A control device for the floating-body wind turbine power generating apparatus according to claim 6,
wherein the pitch control part is configured to control the pitch adjustment mechanism so that an aerodynamic braking force is applied to the rotor by an increase in the pitch angle when the wind turbine generator is stopped,
wherein the pitch control part is configured to control a first change rate of the pitch angle of the blade in a first period during which the wind turbine generator is in an inclining motion toward an upwind side from a vertical direction due to the sway of the floating body to be smaller than a second change rate of the pitch angle of the blade in a second period during which the wind turbine generator is in an inclining motion toward a downwind side from the vertical direction due to the sway of the floating body.

* * * * *